United States Patent
Shanumgam et al.

(10) Patent No.: US 6,708,187 B1
(45) Date of Patent: Mar. 16, 2004

(54) METHOD FOR SELECTIVE LDAP DATABASE SYNCHRONIZATION

(75) Inventors: Udayakumar Shanumgam, San Jose, CA (US); Lavanya Apsani, San Jose, CA (US)

(73) Assignee: Alcatel, Paris (FR)

( * ) Notice: Subject to any disclaimer, the term of this patent is extended or adjusted under 35 U.S.C. 154(b) by 186 days.

(21) Appl. No.: 09/591,801

(22) Filed: Jun. 12, 2000

Related U.S. Application Data

(60) Provisional application No. 60/138,849, filed on Jun. 10, 1999, provisional application No. 60/138,850, filed on Jun. 10, 1999, provisional application No. 60/139,033, filed on Jun. 10, 1999, provisional application No. 60/139,034, filed on Jun. 10, 1999, provisional application No. 60/139,035, filed on Jun. 10, 1999, provisional application No. 60/139,036, filed on Jun. 10, 1999, provisional application No. 60/139,038, filed on Jun. 10, 1999, provisional application No. 60/139,042, filed on Jun. 10, 1999, provisional application No. 60/139,043, filed on Jun. 10, 1999, provisional application No. 60/139,044, filed on Jun. 10, 1999, provisional application No. 60/139,047, filed on Jun. 10, 1999, provisional application No. 60/139,048, filed on Jun. 10, 1999, provisional application No. 60/139,049, filed on Jun. 10, 1999, provisional application No. 60/139,052, filed on Jun. 10, 1999, provisional application No. 60/139,053, filed on Jun. 10, 1999, and provisional application No. 60/139,076, filed on Jun. 11, 1999.

(51) Int. Cl.[7] ............................................. G06F 17/30
(52) U.S. Cl. ...................................... 707/201; 709/224
(58) Field of Search .......................... 707/201; 709/224

(56) References Cited

U.S. PATENT DOCUMENTS

| | | | | |
|---|---|---|---|---|
| 5,677,905 A | * | 10/1997 | Bigham et al. | 370/395.21 |
| 6,070,243 A | * | 5/2000 | See et al. | 713/201 |
| 6,073,175 A | * | 6/2000 | Tavs et al. | 709/226 |
| 6,088,451 A | * | 7/2000 | He et al. | 380/25 |
| 6,141,686 A | * | 10/2000 | Jackowski et al. | 709/224 |
| 6,148,336 A | * | 11/2000 | Thomas et al. | 709/224 |
| 6,374,295 B2 | * | 4/2002 | Farrow et al. | 709/223 |

OTHER PUBLICATIONS

*Common Information Model (CIM) Specification*; Specification; Version 2.2; Distributed Management Task Force, Inc.; Jun. 14, 1999; pp–1–97.

*Directory–enabled Networks, Information Model and Base Schema*; Version 3.0c5; pp. 1–113.

*DMTF LDAP Schema for the CIM v2.4 Core Information Model v1.0, May 6, 2002*; DMTF Specification, DSP0117; Distributed Management Task Force, Inc. (DMTF) 2000; pp. 1–55.

*Dynamic Host Configuration Protocol (DHCP) Service*; Version 0.0–1; Feb. 18, 1998; 7 pp.

*Network Services—Internet Protocol Security*; Version 0.0–2; Feb. 17, 1998; 7 pp.

*Signaled Quality of Service*; Version 0.0–14; Jan. 12, 1998; 6 pp.

(List continued on next page.)

*Primary Examiner*—Wayne Amsbury
(74) *Attorney, Agent, or Firm*—Christie, Parker & Hale; Scot A. Reader; David A. Cordeiro

(57) ABSTRACT

A unified policy management system for an organization including a central policy server and remotely situated policy enforcers. The central policy server includes a central database storing configuration information for the remotely situated policy enforcers. Each policy enforcer includes a policy enforcer database storing a portion of the configuration information associated with the policy enforcer. Changes in the policy settings made at the central policy server are stored in a log for later processing and sending to the appropriate policy enforcers. Upon receipt of the change information, each receiving policy enforcer updates the portion of its policy enforcer database affected by the change.

17 Claims, 30 Drawing Sheets

OTHER PUBLICATIONS

*Simple Network Management Protocol*; posted Feb. 20, 2002; pp. 1–10.

Biswas, Debasish; *Application Class of Service Schemata*; Berkeley Networks Inc.; Feb. 19, 1998; pp. 1–7.

Case, J. et al.; *Introduction to Version 3 of the Internet–standard Network Management Framework*; Network Working Group, Request for Comments: 2570; Apr. 1999; 20 pp.

Case, J. et al.; *A Simple Network Management Protocol (SNMP)*; Network Working Group, Request for Comments: 1157; May 1990; 32 pp.

Chaudhury, R. et al.; *Directory Schema for Service Level Administration of Differentiated Services and Integrated Services in Networks*; pp. 1–17.

Moore, B. et al.; *Information Model for Describing Network Device QoS Datapath Mechanisms*; Policy Framework Working Group; Internet–Draft; Category: Standards Track; Feb., 2002; pp 1–90.

Moore, B. et al.; *Policy Core Information Model—Version 1 Specification*; Network Working Group; Request for Comments: 3060; Feb. 2001; pp. 1–100.

Rajan, R. et al.; *A Simple Framework and Architecture for Networking Policy draft–rajan–policy–framework–00.txt*; Internet Engineering Task Force; Internet Draft; May 23, 1999; 27 pp.

Rajan, R.; *Networking Policy Condition Information Model*; Internet Engineering Task Force; Internet Draft; Apr. 5, 1999; pp. 1–17.

Rajan, R.; *Policy Action Classes for Differentiated Services and Integrated Services*; Internet Engineering Task Force; Apr. 5, 1999; pp. 1–23.

Snir, Y. et al.; *Policy QoS Information Model*; Policy Framework Working Group; Nov. 2001; pp. 1–69.

PCT Search Report for PCT corresponding application, Application No. PCT/US00/16246, including two cited articles, Mar. 6, 2001.

Pohlmann, N., "Sichere It–Loesungen," Net—Zeitschrift Fuer Kommunikationsmanagement, Huthig Verlag, Heilderberg, DE, vol. 51, No. 8/09, 1997, pp. 34–37, XP000720702.

Sun, N., "Internal Firewalls Can Protect Subnetworks form Unauthorized Access," Computer Technology Review, Westworld Production Co.: Los Angeles, vol. 17, No. 6, Jun. 1, 1997, pp 14,16, 18, XP000740492.

* cited by examiner

FIG. 12

| TIME- STAMP | SERVICE | SOURCE IP ADDRESS & PORT | DESTINA- TION IP ADDRESSES & PORT | USER ID | STATUS | OPERA- TION | IN BYTES | OUT BYTES | DURA- TION |
|---|---|---|---|---|---|---|---|---|---|
| 820 | 822 | 824 | 826 | 828 | 830 | 832 | 834 | 836 | 838 |

FIG. 22

METHOD FOR SELECTIVE LDAP DATABASE SYNCHRONIZATION

CROSS-REFERENCE TO RELATED APPLICATIONS

This application claims the benefit of U.S. provisional applications Nos. 60/138,849, 60/138,850, 60/139,033, 60/139,034 60/139,035, 60/139,036, 60/139,038, 60/139,042, 60/139,043, 60/139,044, 60/139,047, 60/139,048, 60/139,049, 60/139,052, 60/139,053, all filed on Jun. 10, 1999, and U.S. provisional application No. 60/139,076, filed on Jun. 11, 1999, the contents of all of which are incorporated herein by reference.

FIELD OF THE INVENTION

The present invention relates to computer networks, and more particularly, to devices and methods for updating configuration database information of remote private networks across the Internet.

BACKGROUND OF THE INVENTION

The growth and proliferation of computers and computer networks allow businesses to efficiently communicate with their own components as well as with their business partners, customers, and suppliers. However, the flexibility and efficiencies provided by such computers and computer networks come with increasing risks, including security breaches from outside the corporation, accidental release of vital information from within it, and inappropriate use of the LAN, WAN, Internet, or extranet.

In managing the growth of computer networks as well as addressing the various security issues, network managers often turn to network policy management services such as firewall protection, Network Address Translation, spam email filtering, DNS caching, Web caching, virtual private network (VPN) organization and security, and URL blocking for keeping network users from accessing certain Web sites through use of the organization's ISP. Each policy management service, however, generally requires a separate device that needs to be configured, managed, and monitored. Furthermore, as an organization grows and spreads across multiple locations, the devices maintained also multiplies, multiplying the associated expenditures and efforts to configure, manage, and monitor the devices.

The solution to this problem is not as simple as just integrating multiple network policy management functions into a single device at each location and allowing each location to share its policy information with other locations. In fact, there are many obstacles and challenges in adopting such an approach. One of these challenges is devising a scheme for specifying, distributing, and updating policy management information effectively across the entire organization. The challenges increase if a directory service protocol such as a Lightweight Directory Access Protocol (LDAP) directory is used to store the policy management information. LDAP database management typically suffers from a lack of flexibility that becomes increasingly relevant as the size of the database increases. These problems generally become more severe in a network with multiple databases that must be synchronized together with multiple applications that require updates to only selected portions of a larger database. For example, conventional approaches to LDAP database management such as SLURPD (stand-alone LDAP update replication daemon) require updates of the entire database and do not include application-specific notification.

Accordingly, there remains a need in the art for a method for efficiently synchronizing multiple LDAP databases storing configuration information including policy management information.

SUMMARY OF THE INVENTION

The present invention is directed to a unified policy management system where various policies, namely, the set of rules and instructions that determine the network's operation, may be established and enforced from a single site. According to one embodiment of the invention, a central policy server maintains a central database storing configuration information for a plurality of edge devices in an organization. Relevant portions of the configuration information are transferred to subordinate databases associated with each of the edge devices. Each edge device may then manage policies for a network in the organization according to the configuration information in its database.

Any changes to the configuration information are made by the central policy server in the central database. The central policy server further creates a log of the changes, stores the log in the central database, and transfers the changes to the affected edge devices for updating their databases.

In one particular aspect of the invention, the central policy server maintains user logs and device logs for the changes. User logs associate the configuration changes to particular users making the changes (e.g. particular network administrators). Policy logs associate the configuration changes to particular edge devices affected by the changes. In creating the policy logs, the changes in the user logs are collected and filtered for each affected edge device and stored in the policy logs associated with the edge device for a later transfer to the edge device.

In another particular aspect of the invention, the central policy server receives a status of the transfer of the configuration changes from the affected edge devices. If the status indicates a successful transfer, the log of changes is deleted from the central database.

BRIEF DESCRIPTION OF THE DRAWINGS

These and other features, aspects and advantages of the present invention will be more fully understood when considered with respect to the following detailed description, appended claims and accompanying drawings wherein:

FIG. 12 is a screen illustration of an exemplary graphical user interface for managing time groups;

FIG. 22 is a schematic layout diagram of a common log format according to one embodiment of the invention;

DETAILED DESCRIPTION OF THE INVENTION

I. Unified Policy Management System Architecture

Figure 1:
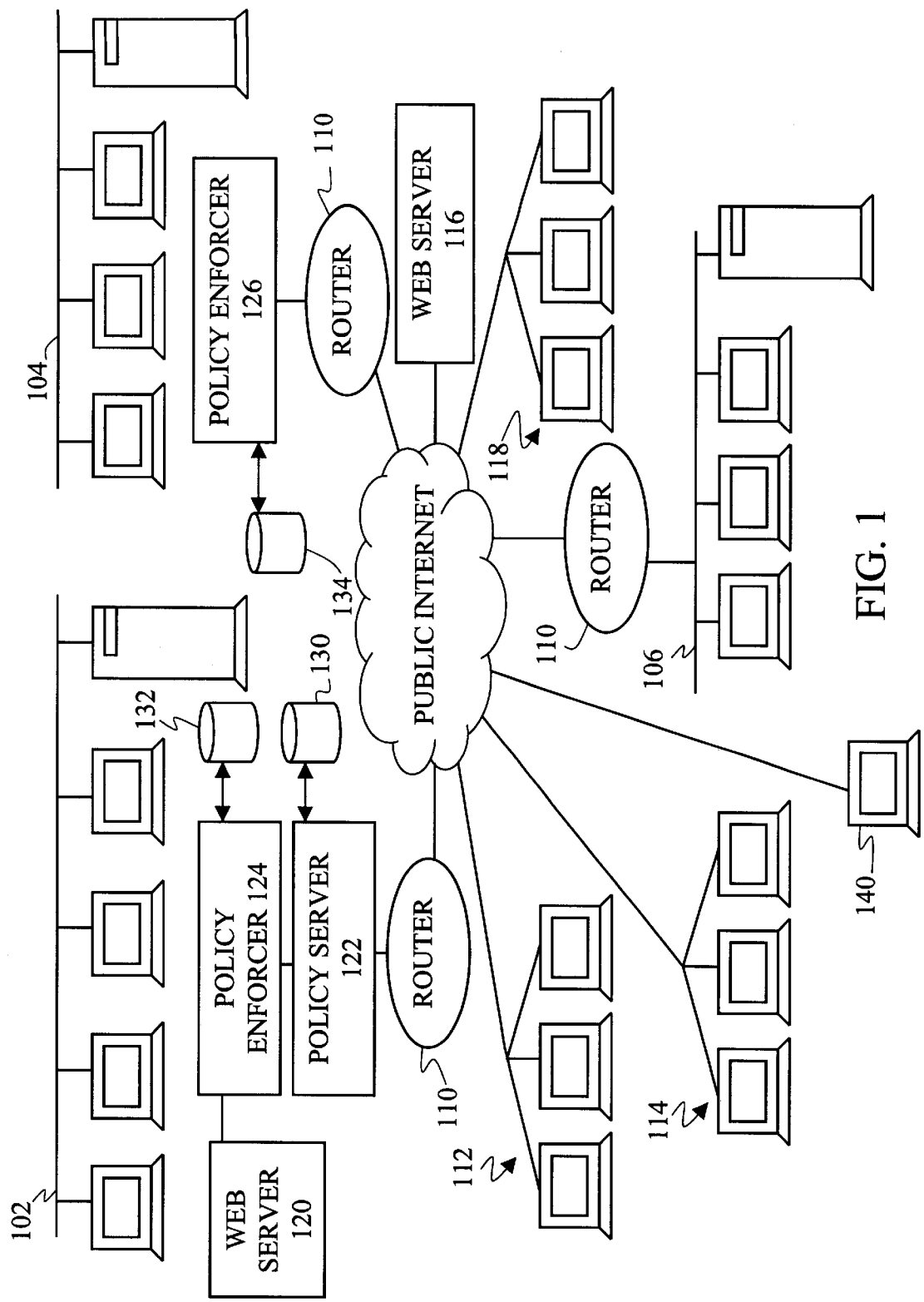
FIG. 1 is a schematic block diagram of an exemplary unified policy management system.

FIG. 1 is a schematic block diagram of an exemplary unified policy management system according to one embodiment of the invention. As illustrated in FIG. 1, private local networks 102, 104, and 106 are all coupled to a public network such as the Internet 108 via respective routers (generally identified at 110) and Internet Service Providers (ISPs) (not shown). Also coupled to the public Internet 108 via the ISPs are web surfers 112, dial-up network users 114, servers providing unauthorized web sites 116, email spammers 118 sending out unsolicited junk email, and remote VPN clients 140 seeking access to the private local networks 102.

According to one example, local network 102 connects users and resources, such as workstations, servers, printers, and the like, at a first location of the organization, such as the organization's headquarters, and local network 104 connects users and resources at a second location of the organization, such as a branch office. Furthermore, local network 106 connects users and resources of a customer of the organization requiring special access to the organization's users and resources. Authorized dial-up network users 114 of the organization are respectively situated at remote locations from the first and second local networks, and also require special access to the organization's users and resources. Furthermore, web surfers 112 communicate with the organization's web server 120 over the public Internet 108 and access the organization's web site.

Local network 102 includes a policy server 122 for defining and managing network services and policies for the organization. The network policies are a set of rules and instructions that determine the network's operation, such as firewall, VPN, bandwidth, and administration policies. The firewall policies decide the network traffic that is to be allowed to flow from the public Internet 108 into the local networks 102, 104, and the traffic that is to be blocked. The bandwidth policies determine the kind of bandwidth that is to be allocated to the traffic flowing through the local networks. The VPN policies determine the rules for implementing multiple site connectivity across the local networks. The administration policies decide the users that have access to administrative functions, the type of administrative functions allocated to these users, and the policy enforcers 124, 126 on which these users may exercise such administrative functions. The firewall, VPN, bandwidth, and administration policies for the entire organization are preferably stored in a policy server database 130 maintained by the policy server 122.

Each local network 102, 104 also includes an edge device, referred to as a policy enforcer 124, 126, for controlling access to the network. Each policy enforcer 124, 126 manages the network policies and services for the users and resources of their respective local networks 102, 104, as permitted by the policy server 122. Respective portions of the policy server database 130 are copied to the policy enforcer databases 132, 134 for allowing the policy enforcers to manage the network policies and services for the local networks 102, 104.

According to one embodiment of the invention, the policy server 122 and policy enforcers 124, 126 may be implemented in a similar fashion as the FORT KNOX series of policy routers made by Alcatel Internetworking, Inc., of Milpitas, Calif.

II. Object Model for Network Policy Management

According to one embodiment of the invention, the policy server database 130 and policy enforcer databases 132, 134 are LDAP databases adhering to a unified hierarchical object oriented structure. The LDAP directory service model is based on entries where each entry is a collection of attributes referenced by a distinguished name (DN). Each of the attributes includes a type and one or more values. The type is typically a mnemonic string, such as "o" for organization, "c" for country, or "mail" for email address. The values depend on the type of attribute. For example, a "mail" attribute may contain the value "babs@umich.edu." A "jpeg-Photo" attribute may contain a photograph in binary JPEG/JFIF format. Additional details of the LDAP directory service model are defined in RFC 1777 "The Lightweight Directory Access Protocol" (W. Yeong, T. Howes, and Kille, Network Working Group, March 1995) and "LDAP Programming: Directory-enabled Applications with Lightweight Directory Access Protocol" (T. Howes, and M. Smith, Macmillan Technical Publishing, 1997), incorporated herein by reference.

The entries in the LDAP database are preferably arranged in a hierarchical tree-like structure reflecting political, geographic, and/or organizational boundaries. Entries representing countries appear at the top of the tree. Below them are entries representing states or national organizations. Below the states or national organizations may be entries representing people, organization units, printers, documents, and the like.

Figure 2:
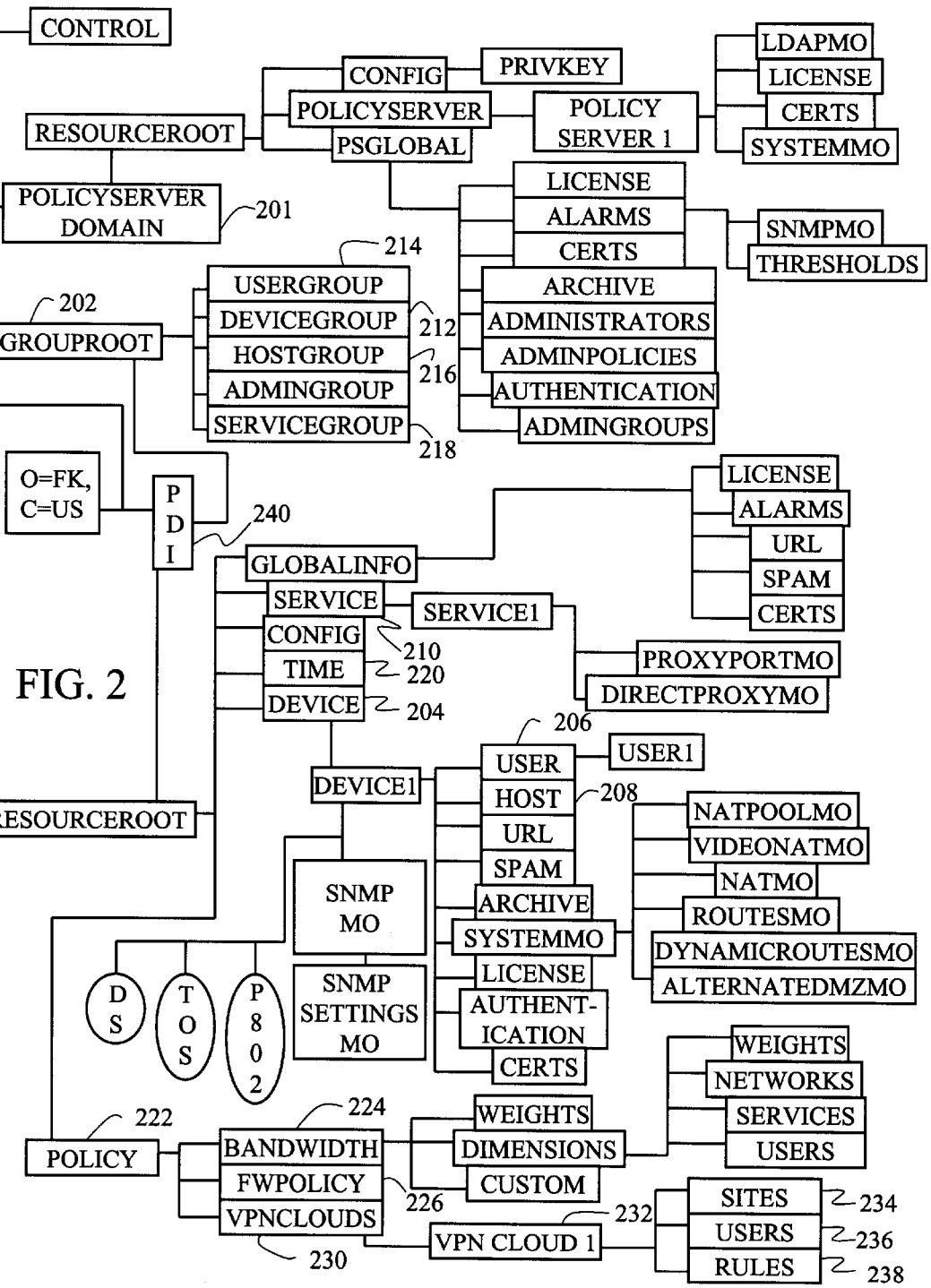
FIG. 2 illustrates the hierarchical object-oriented structure of policies stored for an organization in accordance with the principles of the invention.

FIG. 2 is a schematic layout diagram of a unified hierarchical object oriented structure adhered by the policy server database 130 according to one embodiment of the invention. The policy enforcer databases 132, 134 adhere to a similar structure except for a few differences. For example, the policy enforcer databases preferably do not contain a policy server domain object 201 and related policy server objects, nor a policy domain object 240.

As illustrated in FIG. 2, each object in the structure is preferably stored as an LDAP entry. At the top of the hierarchy is the policy server domain object 201 including various policy server resources and a plurality of policy domains objects (generally referenced at 204). Each policy domain object 240 is a grouping of policy enforcers that share common policies. Each policy domain object 240 includes a resource root object 200 and a group root object 202. All policy management functions are preferably implemented in terms of the resource objects which include devices 204, users 206, hosts 208, services 210, and time 220. Thus, a firewall policy may be defined by simply assigning the particular devices, users, hosts, services, and time applicable to the policy. The devices, users, hosts, and services are preferably organized in groups 212, 214, 216, and 218, respectively, having a group name, description, and member information for a more intuitive way of addressing and organizing the resources.

Users 206 are preferably associated with a user domain providing a secure and efficient means of authenticating the user. Each user domain has a single policy enforcer who is authorized to authenticate the user. Thus, user domains ensure that the authenticating agent is generally located in the same local network as the user. This helps eliminate the cost of network dependency or network latency during the user authentication process. It should be noted, however, that users may also constitute authorized dial-up users 114 and users from the customer network 106. These users contact a remote authenticating agent which proxies the authentication back to the appropriate policy enforcer.

Hosts 208 are the various networks present in an organization. For instance, a particular LAN subnet may be specified as a host in the system. Hosts 208 are preferably organized based on their physical locations within the organization. A host's physical location is identified by the device (policy enforcer) 204 associated with the host.

Services 210 reflect the various services provided by the policy server 122. Such services include, for example, multimedia streaming/conferencing, information retrieval, security and authentication, database applications, mail applications, routing applications, standard communication protocols, and the like. Attributes associated with each service preferably include a service name, description, type (e.g. HTTP, HTTPS, FTP, TELNET, SMTP, Real Networks, and the like), and group.

Devices 204 are the policy enforcers 124, 126 at the edge of a particular local network. Each device/policy enforcer preferably includes users 206 and a host/network 208 that is managed by the policy enforcer.

Time 220 is another dimension in controlling access to the network resources. Various time objects covering a range of times may be created and used in creating the firewall policies.

Similar to resources, network policies are also preferably defined in terms of objects for a more efficient and intuitive definition of the policies. Policies are defined by the administrators and implemented by the policy enforcers 124, 126 on the network traffic flowing between the public Internet 108 and the local networks 102 and 104.

According to one embodiment of the invention, a policy object 222 includes a bandwidth policy 224, firewall policy 226, administration policy (not shown), and VPN policy 230. The VPN policy 230 defines a security policy for the member networks and includes one or more VPN clouds 232. Each VPN cloud 232 is an individual VPN or a group of VPNs defining a security policy group, which includes a list of sites 234 and users 236 who can communicate with each other. A site is preferably a set of hosts/networks physically located behind one of the policy enforcers 124, 126. In other words, a site is a definition of a network, which includes the policy enforcer that is associated with it. The policy enforcers for the sites act as VPN tunnel endpoints once the hosts under the sites start communicating. These communications are governed by a set of rules 238 configured for each VPN cloud. The rules 238 may govern, among other things, VPN access permissions and security features such as the level of encryption and authentication used for the connectivity at the network layer.

The object oriented structure of FIG. 2 thus allows the network administrators to define policies in an intuitive and extensible fashion. Such policies may be defined by simply associating resources to the policies. This allows for a policy-centric management model where the administrator is given the impression that a single logical server provides the firewall, bandwidth management, and VPN services across the enterprise. The fact that the policy is enforced on individual policy enforcers in different locations is transparent to the administrator.

III. Policy-Based Network Architecture

Figure 3:
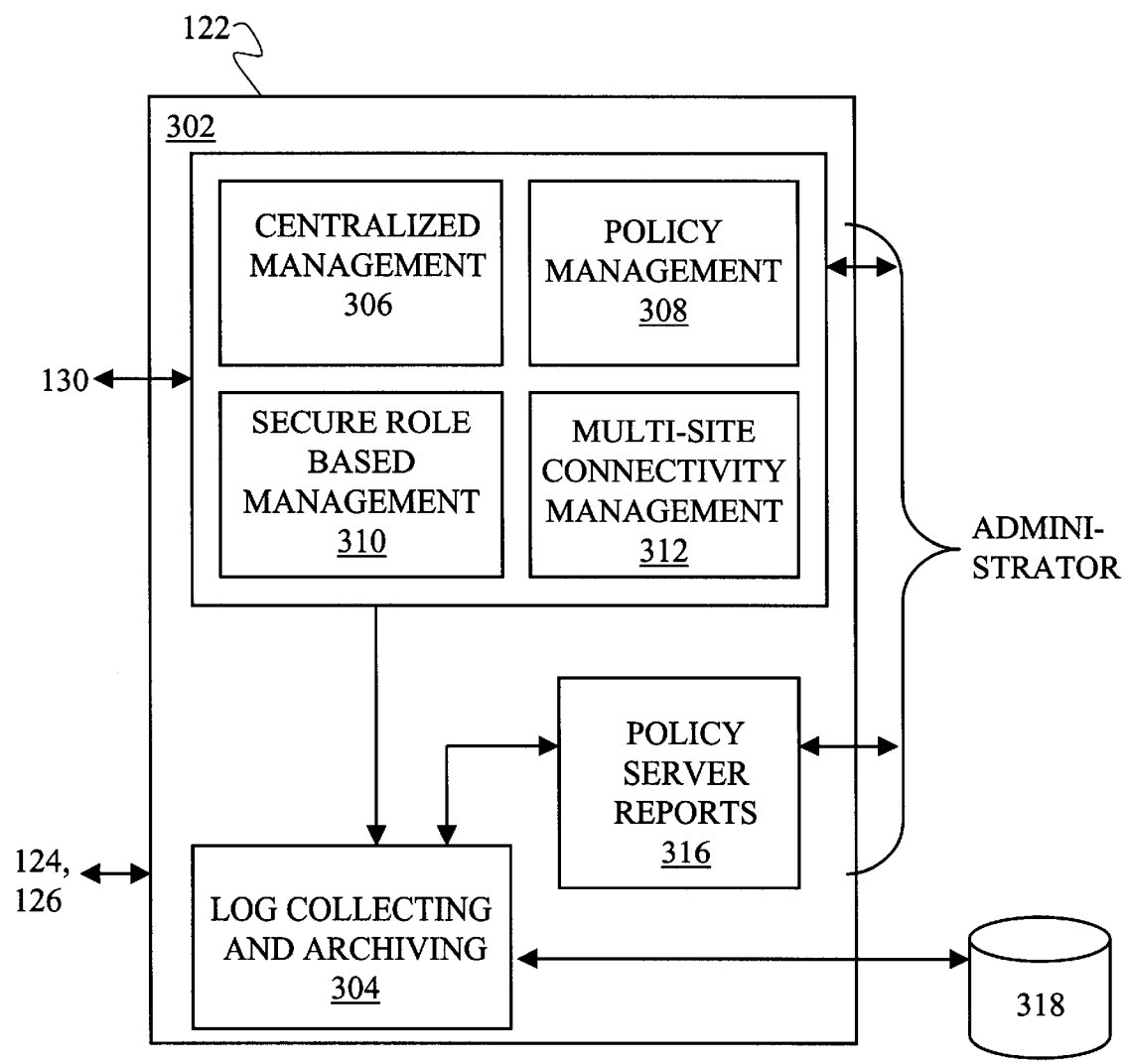
FIG. 3 is a schematic block diagram of a policy server in the policy management system of FIG. 1.

FIG. 3 is a more detailed schematic block diagram of the policy server 122 according to one embodiment of the invention. The policy server 122 preferably includes a management module 302 that allows centralized control over the policy enforcers 124, 126 from a single console. The policy server 122 further includes a log collecting and archiving module 304 and a policy server reports module 316. The log collecting and archiving module 304 collects information about the status and usage of resources from the policy enforcers 124, 126 as well as from the management module 302, and stores them in an archive database 318. The policy server reports module 316 uses the collected logs and archives to generate reports in an organized report format.

Referring again to the management module 302, the management module 302 preferably includes four submodules aiding in the centralized control, namely, a centralized management sub-module 306, policy management sub-module 308, secure role-based management sub-module 310, and multiple site connectivity management sub-module 312.

The centralized management sub-module 306 enables a network administrator to install and manage individual policy enforcers from a central location. The network administrator preferably uses a web-based graphical user interface to define the policy enforcer's network configuration and monitor various aspects of the device, such as device health, device alarms, VPN connection status, and the like.

The policy management sub-module 308 provides the network administrator with the ability to create policies that span multiple functional aspects of the policy enforcer (e.g. firewall, bandwidth management, and virtual private networks), multiple resources (e.g. users, hosts, services and time), and multiple policy enforcers.

The secure role-based management sub-module 310 provides role-based management to enable administrators to delegate administrative responsibilities to other administrators. This sub-module preferably provides for maximum security when it comes to accessing the management functions.

The multiple site connectivity management sub-module 312 allows the network administrator to set-up secure communication channels between two or more remote sites. In doing so, this sub-module leverages the centralized management sub-module 306, policy management sub-module 308, dynamic routing capabilities of the policy enforcers 124, 126, and the management infrastructure to provide virtual private networks across the enterprise with fine grained access control.

Figure 4:
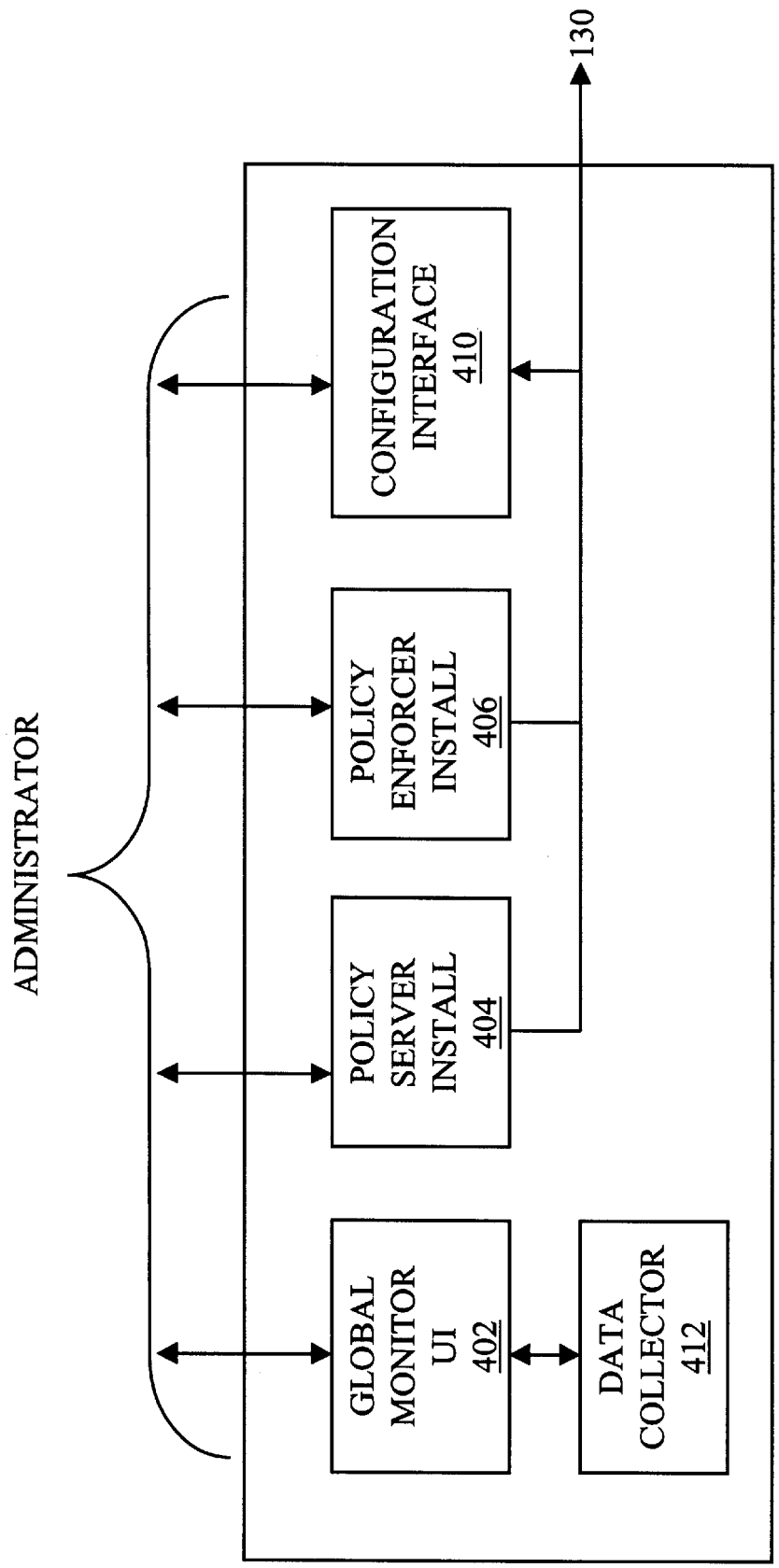
FIG. 4 is a schematic diagram of a central management sub-module in the policy server of FIG. 3.

FIG. 4 is a more detailed schematic diagram of the central policy management sub-module 306 according to one embodiment of the invention. The sub-module includes a policy server installation wizard 404 providing an interactive user interface to aid the installation of the policy server 122. In this regard, the network administrator has access to a personal computer connected to a LAN port of the policy server 122 via a cross over cable, hub, or the like. The network administrator connects to the policy server 122 by preferably typing-in a URL of the policy server 122 into a standard Internet browser such as Microsoft Internet Explorer. The URL is preferably of the form of "http://<ipaddress>:88/index.html" where <ipaddress> is the IP address that is to be assigned to the policy server. The IP address is automatically assigned to the policy server when the browser attempts to contact the address. When the administrator's personal computer sends an address resolution protocol request for the IP address, the policy server detects that a packet directed to port 88 is not claimed, and assumes the IP address.

Once connected, the policy server installation wizard 404 invokes the interactive user interface to assist the administrator in setting up the policy server 122. Among other things, the policy server installation wizard 404 prompts the administrator to specify a server name, server IP address, and router IP address. Furthermore, the policy server installation wizard 404 prompts the administrator to select one of various default policies for creating default firewall, VPN, bandwidth, and administrator policies. These policies are then replicated on each new policy enforcer registering with the policy server 122.

The centralized management sub-module 306 further includes a policy enforcer installation wizard 406 providing an interactive user interface to aid the installation of the policy enforcers 124, 126. As with the installation of the policy server 122, the access to the wizard 406 is preferably web-based using the network administrator's personal computer.

Once connected, the policy enforcer installation wizard 406 invokes the interactive user interface to assist the network administrator in setting up a particular policy enforcer 124, 126. Among other things, the policy enforcer installation wizard 464 prompts the administrator to specify the policy server IP address, policy enforcer IP address, and router IP address. The policy enforcer then registers with the policy server 122 by invoking a URL on the policy server with basic bootstrap information of its own. The registration of the policy enforcer allows the initialization of the policy enforcer's database 132, 134 with the configuration information, as well as the monitoring of the policy enforcer's status and health by the policy server 122.

Prior to registering the policy enforcer with the policy server 122, the network administrator preferably pre-registers the policy enforcer on the policy server. Such pre-registering allows the creation of a placeholder node on the policy server for the policy enforcer data for when the policy enforcer does in fact register. In this regard, the centralized management sub-module 306 includes a configuration interface 410 allowing the pre-registration of a new policy enforcer.

Figure 5:
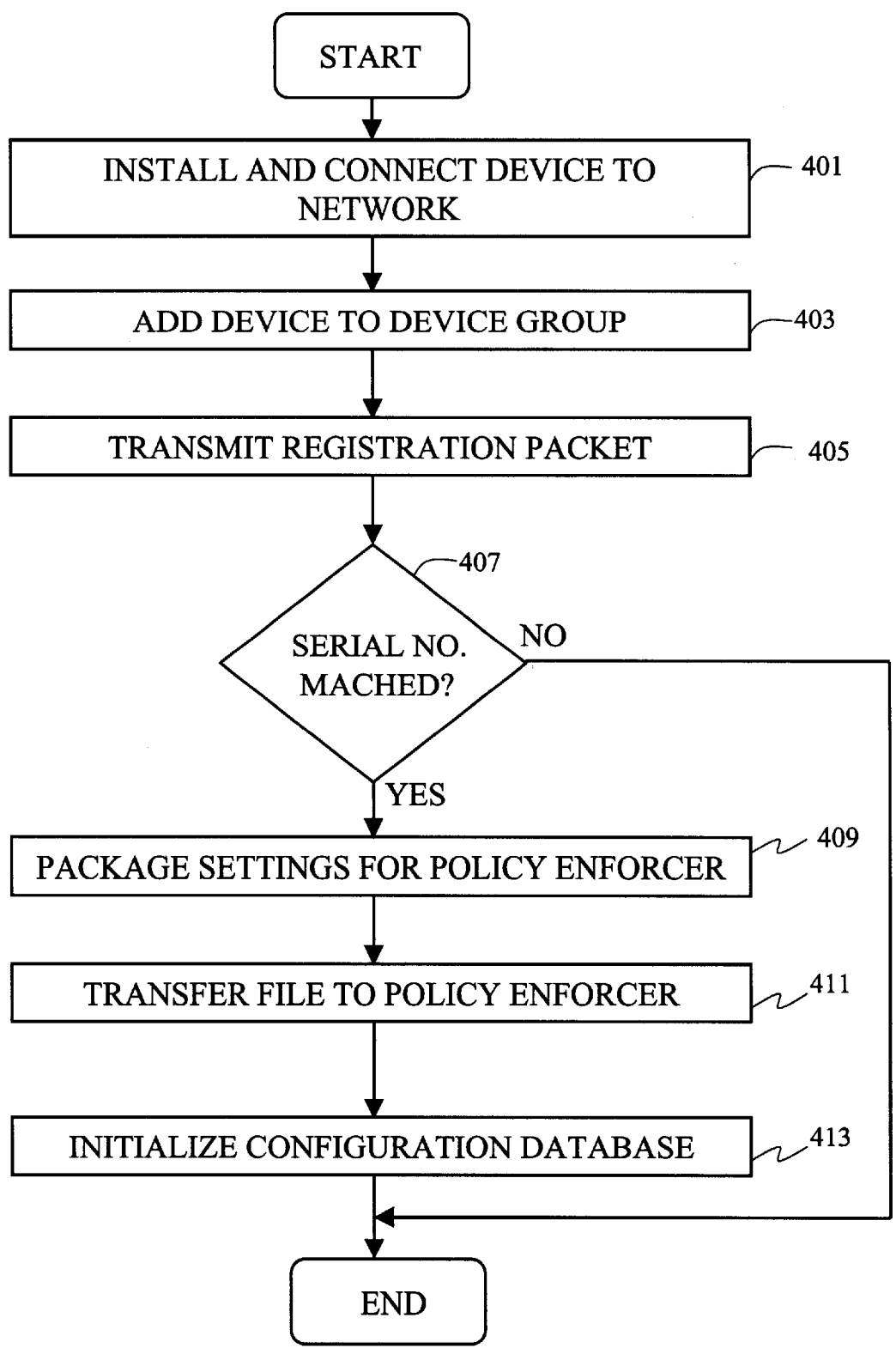
FIG. 5 is an exemplary flow diagram of a device registration process carried out by the central management sub-module of FIG. 4.
Figure 6:
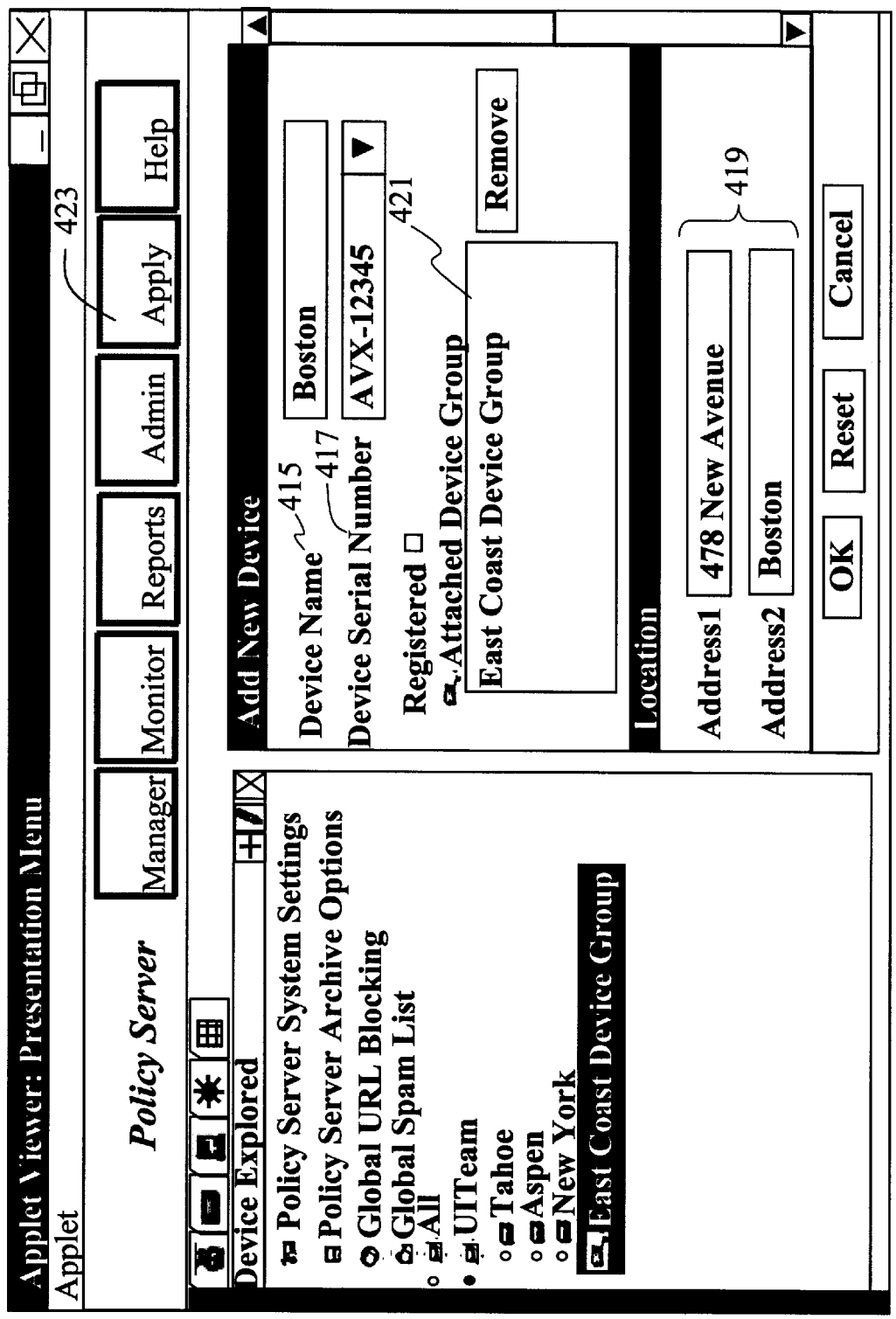
FIG. 6 is a screen illustration of an exemplary graphical user interface for registering a device.

FIG. 5 is an exemplary flow diagram of a policy enforcer pre-registration and registration process according to one embodiment of the invention. In step 401, the policy enforcer is connected to the network and installed at its actual physical location using the above-described policy enforcer installation wizard 406. The network administrator, possessing the new device's serial number, pre-registers the policy enforcer by adding the new policy enforcer to a device group in step 403. In this regard, the configuration interface 410 invokes an interactive graphical interface, such as the one illustrated in FIG. 6, allowing the network administrator to enter a device name 415, serial number 417, and location information 419, and further allowing the administrator to select a device group 421 to which the new policy enforcer is to belong. Actuation of an apply button 423 causes the new policy enforcer, in step 405, to contact the policy server 122 by preferably invoking a URL on the policy server. Once the policy server has been contacted, the new policy enforcer transmits its registration packet to the policy server. The registration packet includes at least a serial number of the new policy enforcer, as well as the IP addresses of the LAN, WAN, and DMS on the policy enforcer. In step 407, the centralized management sub-module 306 compares the serial number of the new policy enforcer with the list of policy enforcers pre-registered with the policy server 122. If a match is found, the policy server 122 proceeds with the registration process by packaging, in step 409, the settings selected for the policy enforcer during its installation process, preferably into an LDAP Data Interchange Format (ldif) file. In step 411, the file is transmitted to the policy enforcer, preferably over an HTTPS channel, by invoking a common gateway interface (CGI) on the policy enforcer. The policy enforcer then uses the file to initialize its configuration database, such as database 132, 134, in step 413.

Referring again to FIG. 4, the centralized management sub-module 306 also includes a global monitor user interface 402 and a data collector program 412, respectively displaying and collecting the health and status of all the policy enforcers managed by the policy server 122. The data collector program 412 receives health and status information from each of the up-and-running policy enforcers it manages, and passes the relevant information to the global monitor user interface. A health agent running as a daemon in each of the policy enforcers being monitored periodically collects data from the device and analyzes its health status. The collected data is then transferred to the policy server 122 when requested by the data collector program 412.

Figure 7:
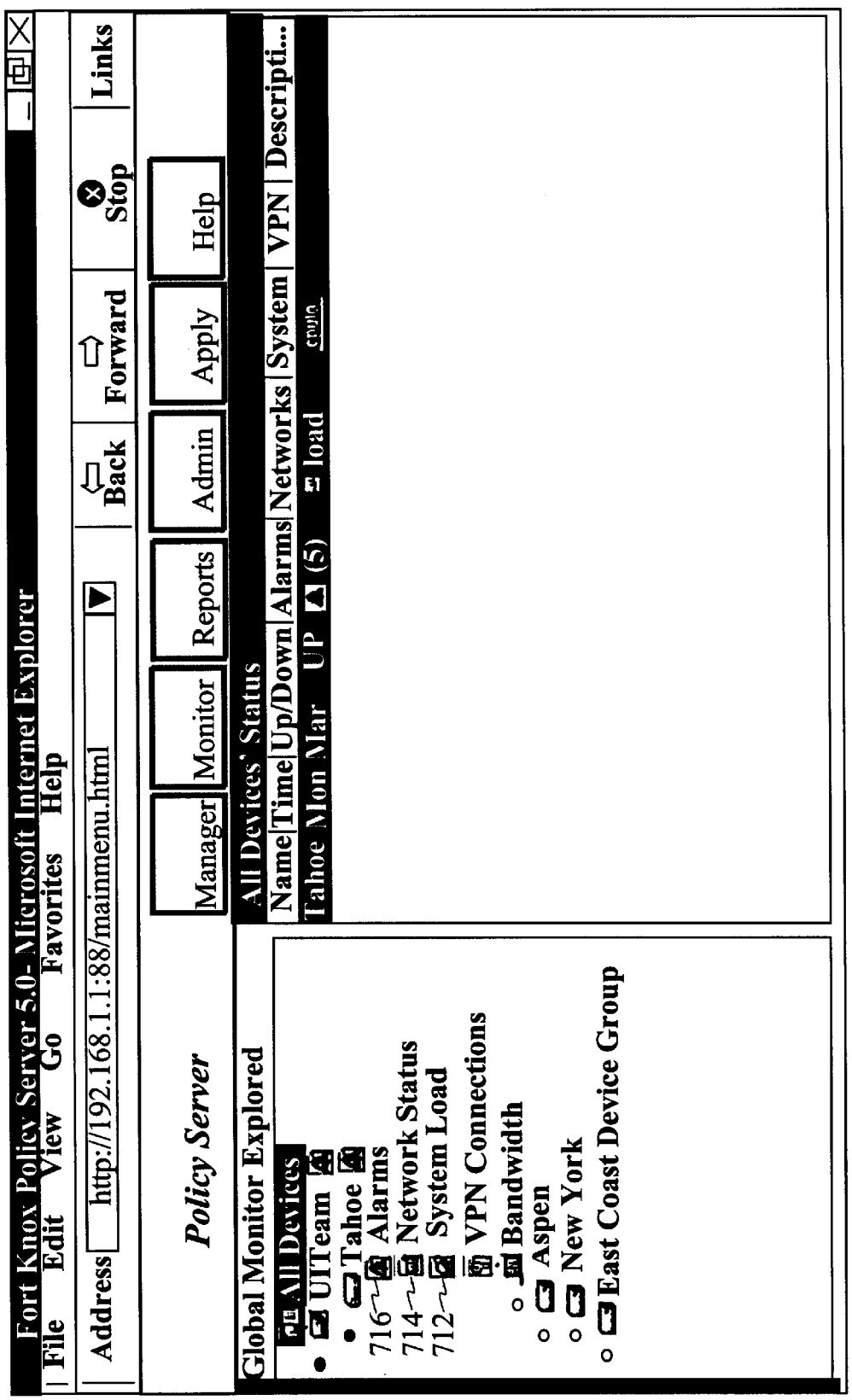
FIG. 7 is a screen illustration of an exemplary global monitor user interface presenting device health and status information.

FIG. 7 is a screen illustration of an exemplary global monitor user interface 402 presenting various types of health and status information. Such information may relate to the health of the device, such as system load 712 and network usage information 714. The information may also relate to current alarms 716 on the device including alarm name, type, description, and the like. The information may further relate to current VPN connections 718 including connection type, source/destination, duration, and VPN traffic volume.

Referring again to FIG. 3, the policy management sub-module 308 allows for policy management of the policy enforcers 124, 126. As discussed above, all policy management functions are implemented in terms of resource objects stored in the policy databases 130, 132, 134 including users, devices, hosts, services, and time. Preferably, all resources are associated with default policy settings selected by the administrator during the installation process. The network administrator views, adds, and modifies the policies centrally via a graphical user interface provided by the policy management sub-module 308. This allows for a policy-centric management model where the administrator is given the impression that a single logical server provides the firewall, bandwidth management, and VPN services across the enterprise. The fact that the policy is enforced on individual policy enforcers in different locations is transparent to the administrator.

Figure 8:
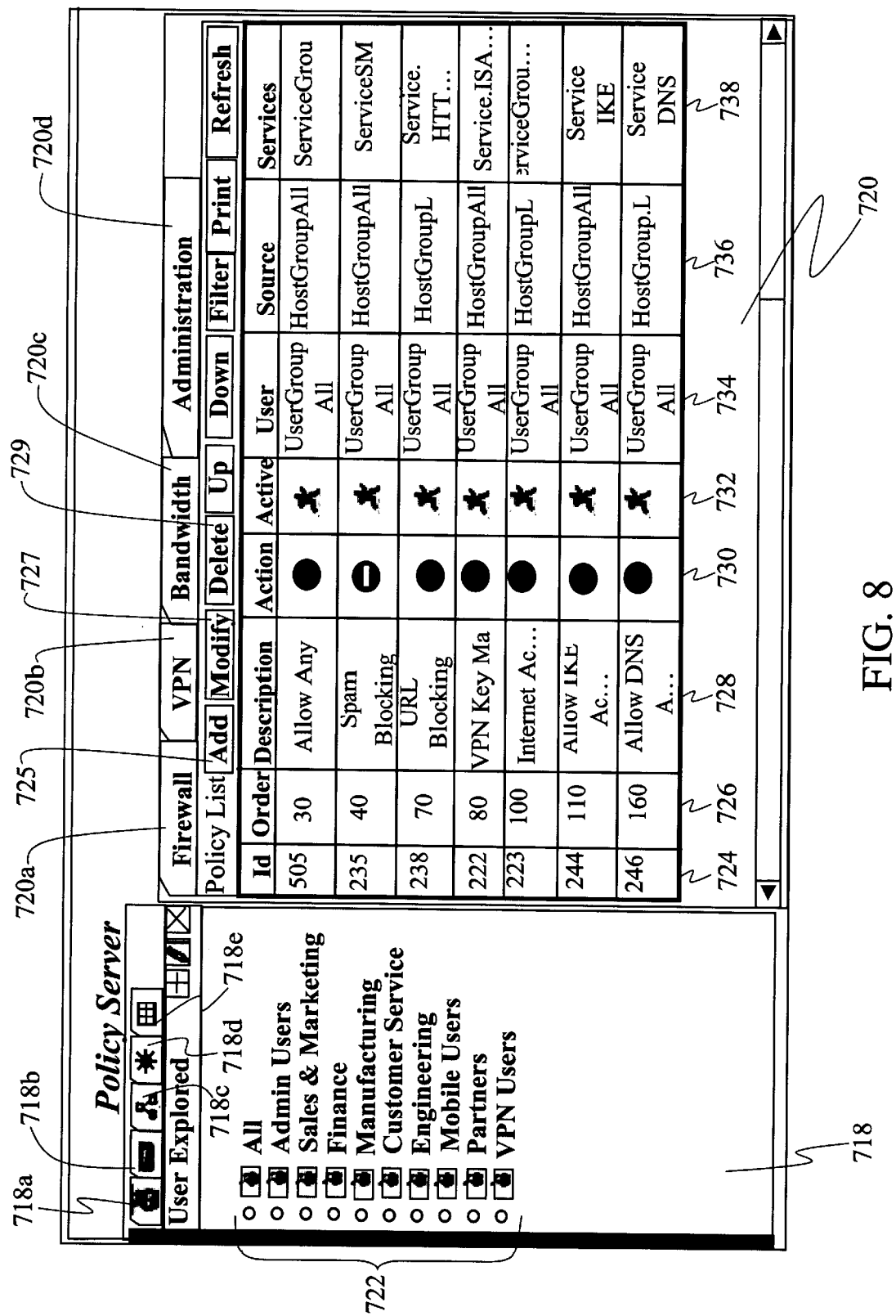
FIG. 8 is a screen illustration of an exemplary graphical user interface provided by a policy management sub-module in the policy server of FIG. 3.

FIG. 8 is a screen illustration of an exemplary graphical user interface provided by the policy management sub-module 308. The interface includes a resource palette 718 including a list of resource tabs including a users tab 718a, devices tab 718b, hosts tab 718c, services tab 718d, and time tab 718e. The resource palette allows the administrator to add and modify resource definitions from a single console.

Selection of the users tab 718a causes a display of the user groups 722 defined for the system. New users may be added to the group by selecting a particular group and defining various attributes of the user such as a login name, full name, policy enforcer to which the user belongs, authentication scheme, password, and the like.

Figure 9:
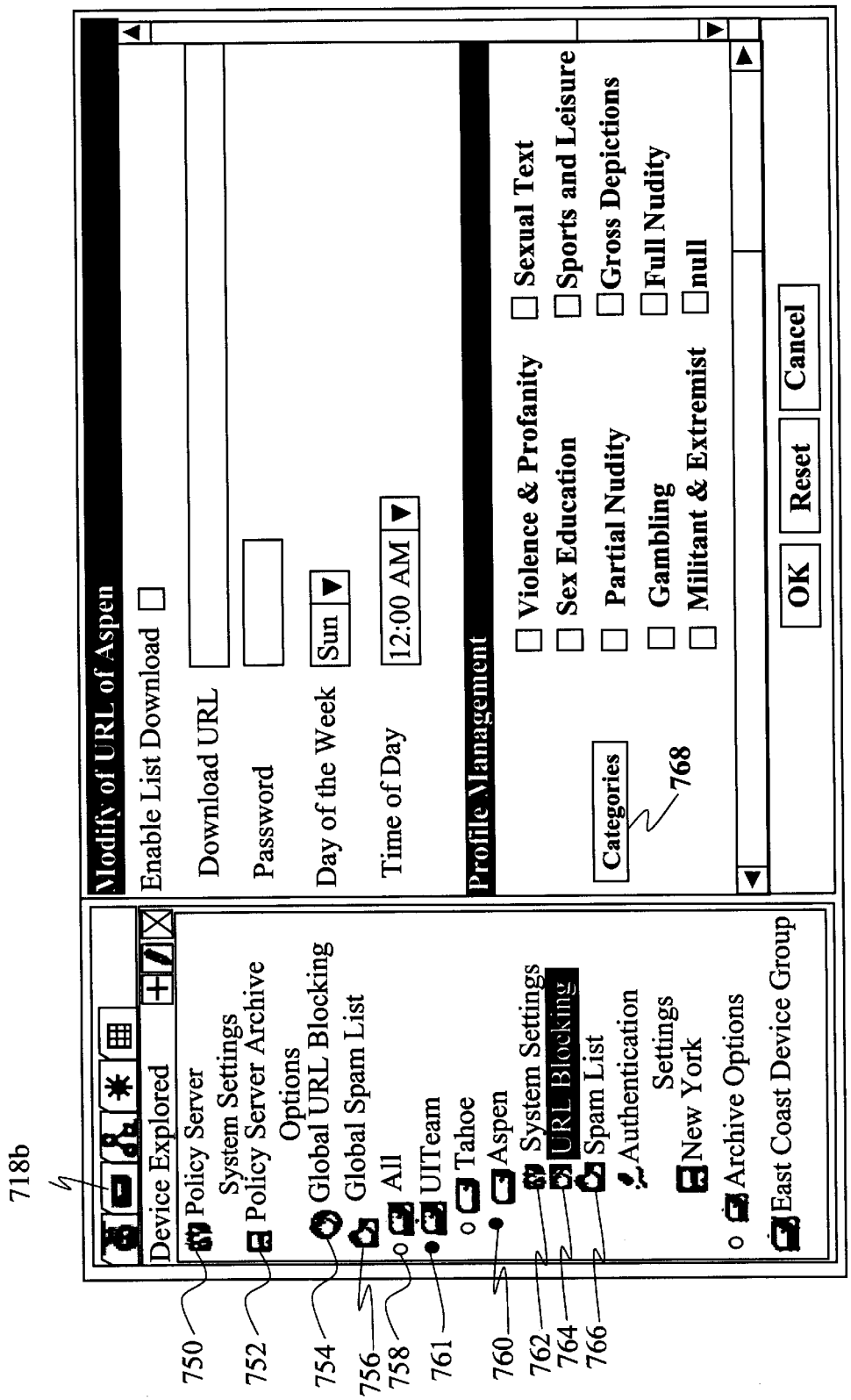
FIG. 9 is a screen illustration of an exemplary graphical user interface for managing system devices.

Selection of the devices tab 718b causes a display of various device management icons for managing the policy server 122 and the policy enforcers 124, 126 as is illustrated in FIG. 9. A policy server systems settings icon 750 allows the network administrator to view and modify system settings like LAN, WAN/DMS IP addresses of the policy server 122. A policy server archive options icon 752 allows specification of reporting and other database archive options at the policy server 122. A global URL blocking icon 754 allows the administrator to specify a list of unauthorized web sites 116 to be blocked by all the policy enforcers 124, 126 of the system. Similarly, a global spam list icon 756 allows the administrator to specify a list of email addresses of spammers 118 to be blocked by all the policy enforcers.

The administrator may view information on all the policy enforcers 124, 126 by selecting icon 758. Information on a specific policy enforcer may be viewed by selecting a specific policy enforcer 760 under a particular device group 761. Such information includes system settings information 762, URL blocking information 764, spam list information 766, and the like, that is specific to the selected policy enforcer. For instance, selection of the policy enforcer's URL blocking information 764 icon causes a display of various categories 768 of URLs that the network administrator may select to block for the selected policy enforcer.

Figure 10:
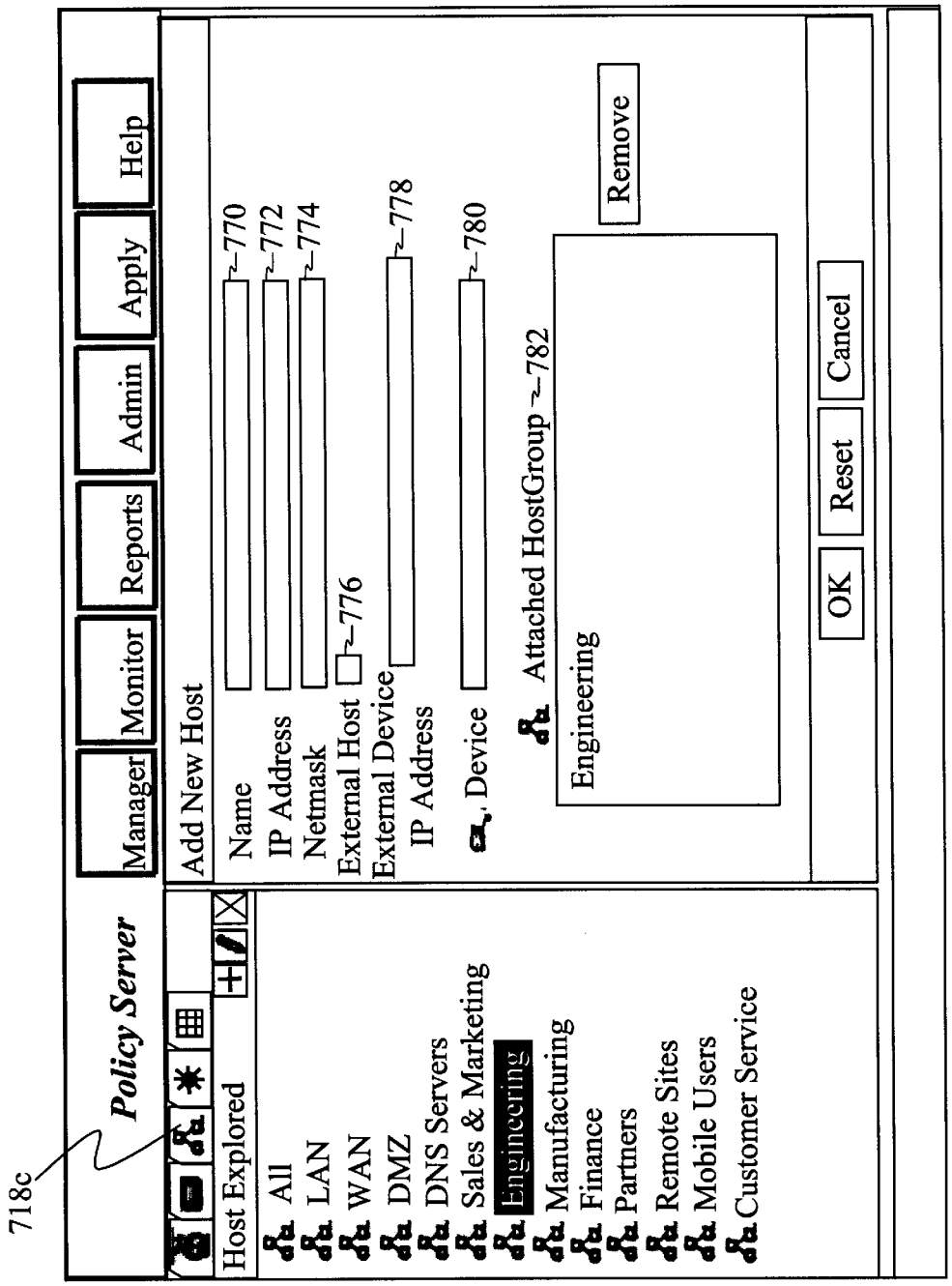
FIG. 10 is a screen illustration of an exemplary graphical user interface for managing system hosts.

Selection of the hosts tab 718c causes a display of various hosts (networks) of the system as is illustrated in FIG. 10. A host is organized based on its physical location and is further associated with a particular policy enforcer 124, 126. Hosts are associated with various attributes including a unique name 770, an IP address of the network 772, and a subnet mask 774. In addition, the administrator may specify whether the host is an external host 776 belonging to a network that is not administered by the policy server 122. If the host is an external host, the administrator specifies an IP address 778 of the external device to which the host belongs. A device field 780 allows the administrator to enter the policy enforcer's name to which the host belongs. Each host is further associated with a particular group 782 assigned by the administrator.

Figure 11:
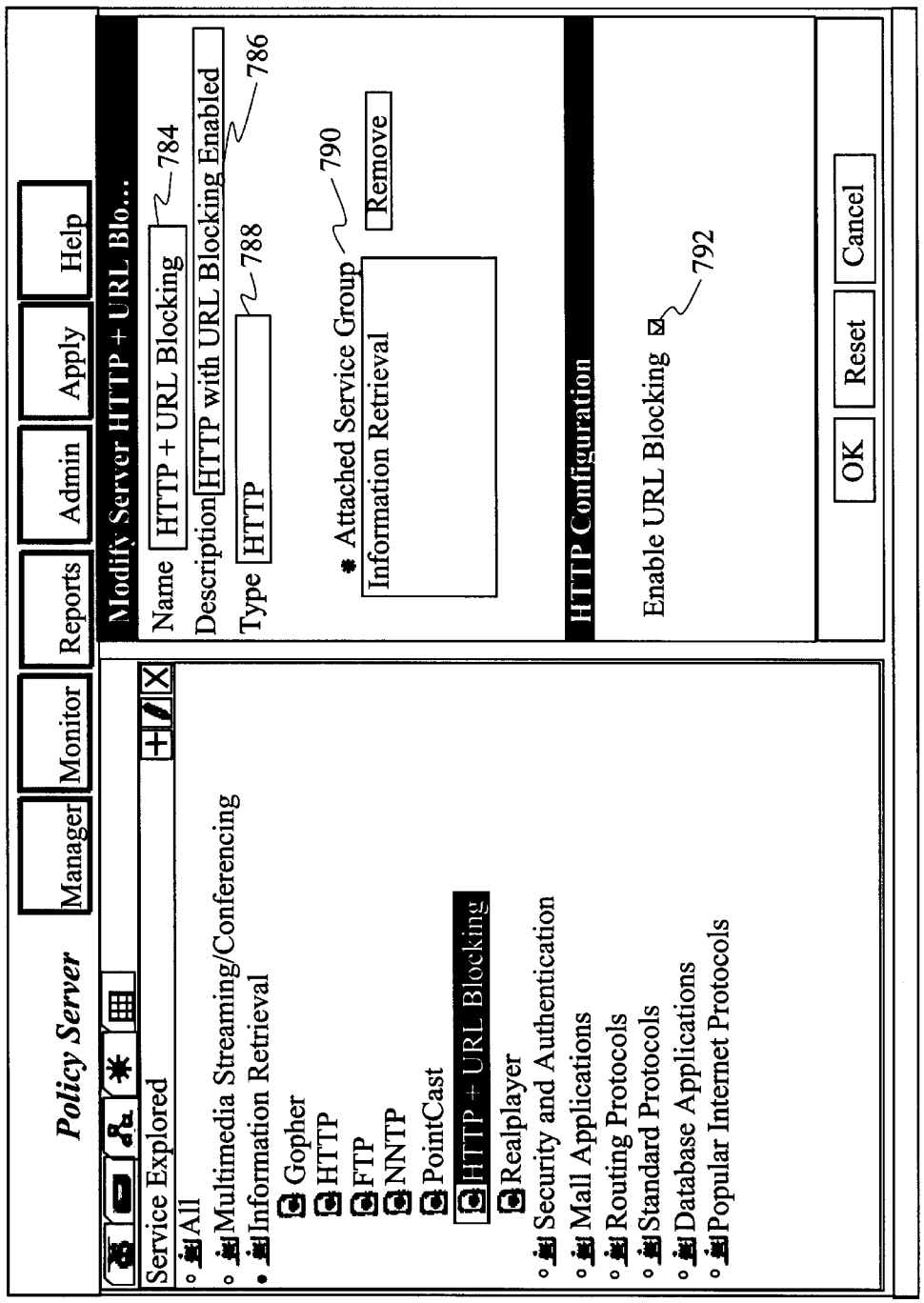
FIG. 11 is a screen illustration of an exemplary graphical user interface for managing system services.

Selection of the services tab 718d causes a display of various service groups supported by the policy server 122 as is illustrated in FIG. 11. Such service groups include, for example, multimedia streaming/conferencing, information retrieval, security and authentication, mail applications, routing applications, database applications, standard communication protocols and the like. Users may also add new service groups as desired.

Each service is associated with a name 784, description 786, and service type 788 (e.g. HTTP, HTTPS, FTP, TELNET, SMTP, Real Networks, and the like). Furthermore, each service is associated with a service group 790. Based on the type of service, additional information may also be specified for the service. For instance, for an HTTP service, the administrator may specify whether URL blocking 792 is to be enabled.

Figure 12:
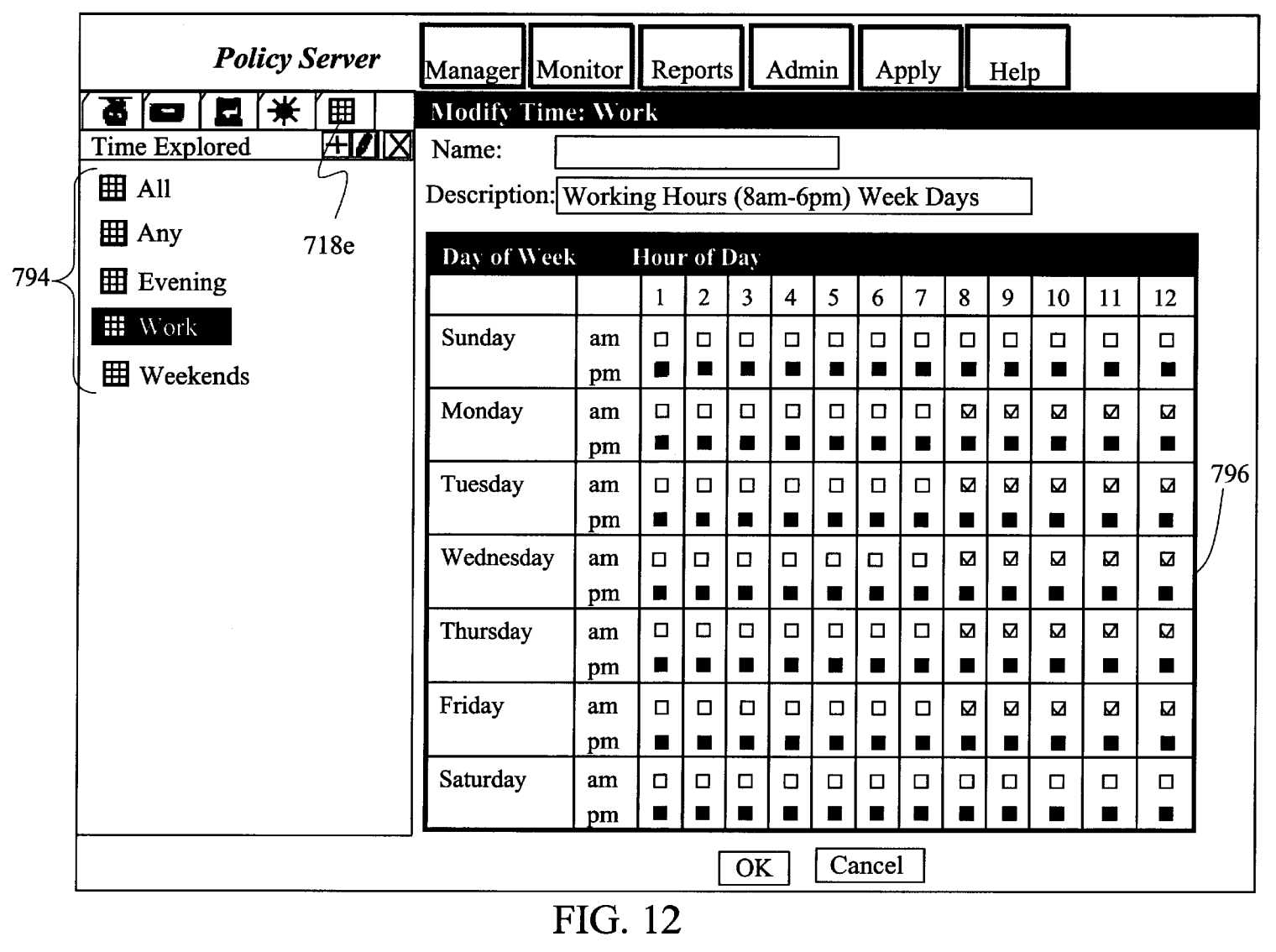

Selection of the time tab 718e causes a display of various time group icons 794 covering a range of times to be used in the firewall policies as is illustrated in FIG. 12. For instance, selection of a work time group icon allows the network administrator to set the days and times which are to be set as working days and hours.

Referring again to FIG. 8, the interface also includes a policy canvas 720 including a list of policies available to the system. A policy definition is preferably an association of a set of resources that may be dragged from the resource palette 718 and dropped onto the policy canvas 720.

Selection of a firewall tab 720a causes a display of all the firewall policies defined for a particular policy domain including one or more policy enforcers. The network administrator decides the domain to which a policy enforcer is to belong during pre-registration of the policy enforcer. The interface allows the network administrator to view, add, and modify the various policies from the policy server 122 and effectuate the changes on the policy enforcers 124, 126 without the need to make such changes individually in each policy enforcer.

According to one embodiment of the invention, each firewall policy includes a policy identifier (ID) attribute 724 for identifying a particular policy rule in the list of policies. An order number attribute 726 for the policy rule indicates the sequence in which the policy is to be applied. In this regard, the policy enforcer 124, 126 for the local network takes one rule at a time, in sequence, compares it against the network traffic, and preferably applies the first rule that matches the network traffic.

Each firewall policy also includes a description attribute 728 for describing the firewall policy to be applied. For instance, the description may indicate that the policy allows spam blocking, URL blocking, VPN key management, and the like. An action flag attribute 730 indicates whether traffic is to be allowed or denied for the indicated policy. An active flag attribute 732 indicates whether the policy has been activated or de-activated. Thus, the network administrator may create a policy and activate it at a later time. A policy that has been de-activated preferably has no effect on the network traffic.

Each firewall policy further includes a user attribute 734, source attribute 736, service attribute 738, destination attribute (not shown), and time attribute (not shown). Each of these attributes is preferably represented by a group name or a resource name. The name acts as a pointer to an entry in the group root object 202 or resource root object of the LDAP database 130, 132, or 134.

Preferably, the user attribute 734 indicates the user groups and users that are eligible for the policy. The source attribute 736 indicates a point of origination of the network traffic associated with the user. The service attribute 738 indicates the services to be allowed or denied by the policy. The destination attribute indicates a specific LAN, WAN, DMS segment or specific hosts where the specified services are to be allowed or denied. For example, to configure SMTP pop services on a mail server, the host may be the IP address where the mail server is running, and the services specified is SMTP. The time attribute indicates a time slot in which the policy is to be effective.

In addition to the above, each firewall policy also includes an authentication attribute (not shown) indicating an authentication scheme for the policy (e.g. none, LDAP, SecurID, RADIUS, WinNT, or all).

Figure 14:
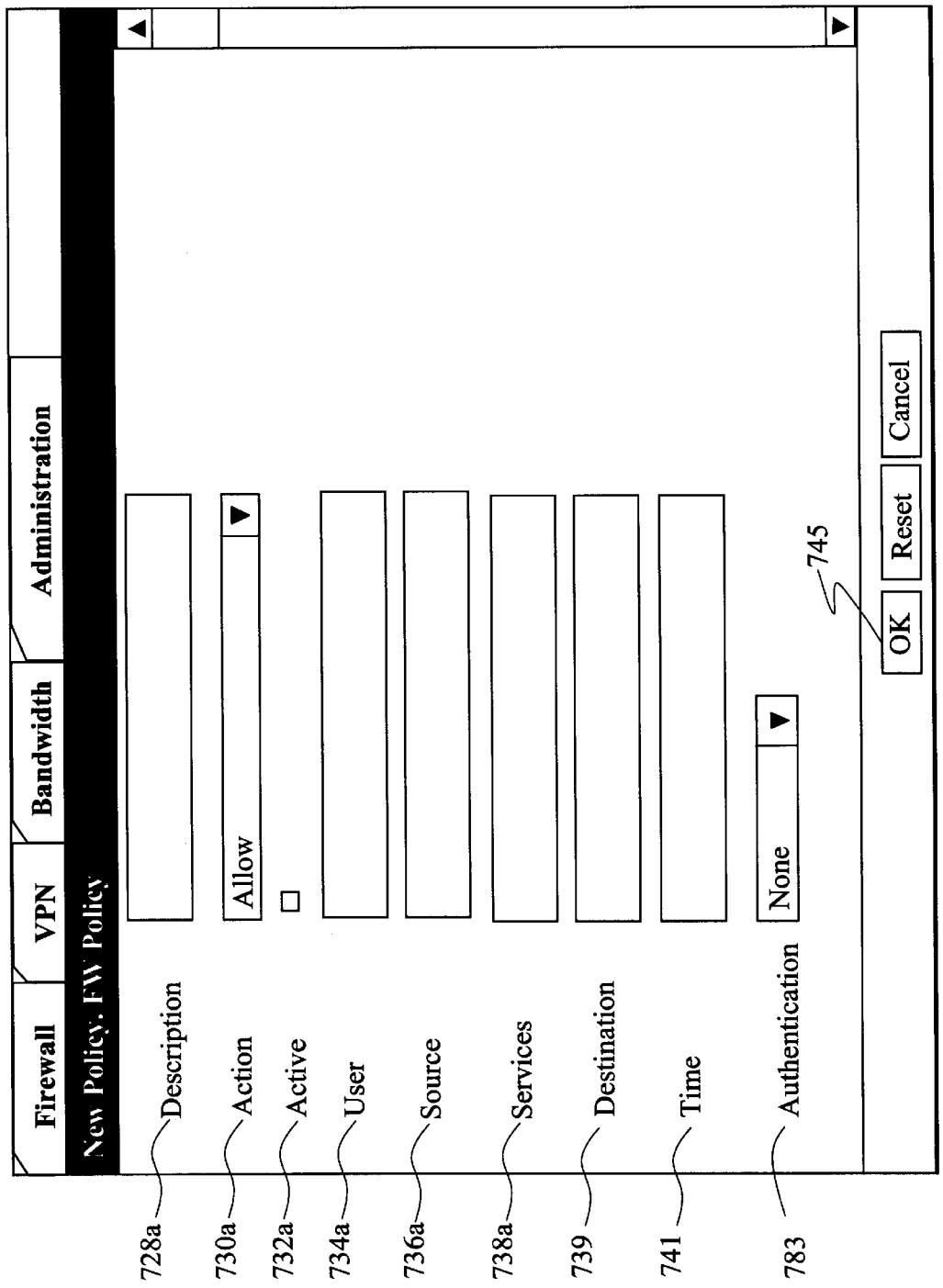
FIG. 14 is a screen illustration of an exemplary graphical user interface for adding a new firewall policy.

FIG. 14 is a screen illustration of an exemplary graphical user interface for adding a new firewall policy to the policy domain upon actuation of an add button 725. Existing firewall policies may also be modified or deleted by actuation of a modify button 727 and a delete button 729, respectively.

As illustrated in FIG. 14, a new firewall policy may be defined by simply adding a description of the policy in a description area 728a, selecting an action to be applied to the matching network traffic in an action box 730a, and indicating in an active area 732a whether the policy is to be active or inactive. Furthermore, the network administrator specifies the user, source, services, destination, and time resources in a user area 734a, source area 736a, services area 738a, destination area 739a, and time area 741, respectively. The network administrator further selects an authentication scheme for the policy in an authentication area 743. Upon actuation of an OK button 745, appropriate entries of the policy server database's LDAP tree are suitably changed to reflect the addition of the new policy. The change is also transmitted to the respective policy enforcers as is described in further detail below.

Referring again to FIG. 8, selection of the bandwidth tab 720c allows the display, addition, and modification of various bandwidth policies determining the kind of bandwidth to be allocated to a traffic flowing through a particular policy enforcer. Different bandwidths may be specified for different users, hosts, and services.

Selection of the administration tab 720d allows the display, addition, and modification of various administrative policies allowing a head network administrator to delegate administrative responsibilities to other administrators. In this regard, the head network administrator specifies administration policies that determine which users have access to what functions, and for what devices. Preferably the administration policies include similar attributes as the firewall rules except for the specification of a role attribute. Extra administrative privileges may be afforded to certain users depending on their role.

IV. Virtual Private Network Having Automatic Reachability Updating

Referring again to FIG. 3, the multi-site connectivity management module 312 allows the creation of dynamically routed VPNs where VPN membership lists are automatically created without statically configuring the membership information by the network administrator. Thus, once the administrator configures a VPN from one policy enforcer's LAN to another, routing protocols such as RIPv1 or RIPv2 running on the LAN interfaces learn about the networks reachable through their respective interfaces. These networks then become the VPN's members, and the policy enforcers 124, 126 on either side of the VPN create membership tables using the learned routes. The membership information is preferably exchanged between the policy enforcers 124, 126 through the LDAP databases 132, 134. Thus, the combined use of routing protocols and LDAP allows the creation of VPNs whose member lists are dynamically compiled.

Figure 13:
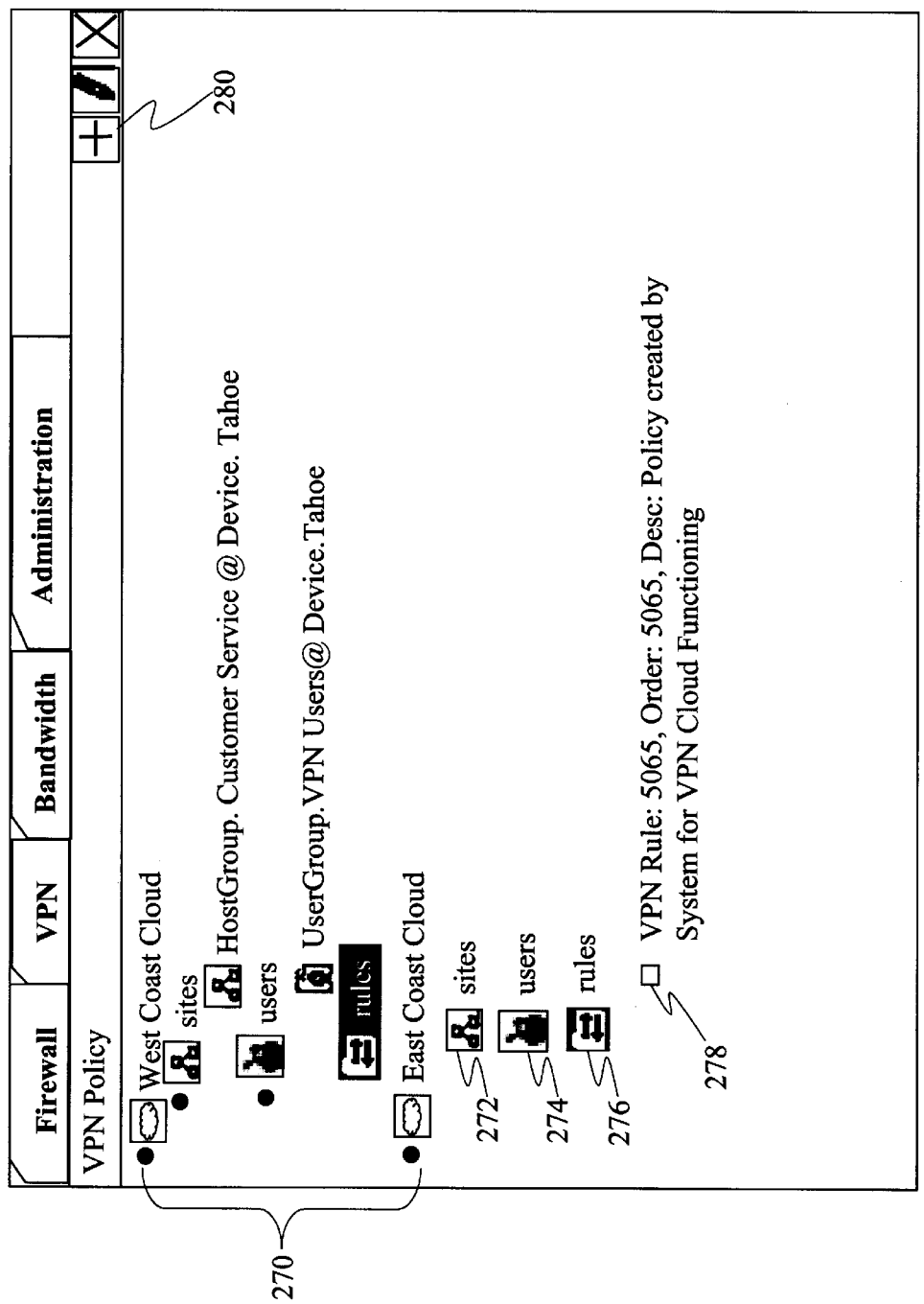
FIG. 13 is a screen illustration of an exemplary graphical user interface displaying a plurality of VPN clouds.

Referring again to FIG. 8, the network administrator configures VPN policies for multiple site connectivity using the resource palette 718 and policy canvas 720. Selection of the VPN tab 720b in the policy canvas 720 causes the display of a collection of VPN clouds 270 already configured for the system as is illustrated in FIG. 13. As described above, a VPN cloud is an individual VPN or a group of VPNs for which a security policy may be defined. Each VPN cloud includes a list of sites under a sites node 234 and users under a users node 236, who can communicate with each other. A site is a set of hosts that are physically behind one of the policy enforcers 124, 126. The policy enforcers for the sites preferably act as VPN tunnel endpoints once the hosts under the sites start communicating.

The users in the VPN cloud are the users who may access the hosts associated with the sites 234. The users access the hosts as VPN clients using VPN client software installed in each user's personal computer as is described in further detail below.

Each VPN cloud 270 further includes a firewall rules node 276 including firewall rules to be applied to all the connections in the cloud. The rules may govern, among other things, VPN access permissions, security features such as the level of encryption and authentication used for the connectivity at the network layer.

The hierarchical organization provided by the VPN clouds thus allows the network administrator to create fully meshed VPNs where every site within a VPN cloud has full connectivity with every other site. The network administrator need no longer manually configure each possible connection in the VPN, but only need to create a VPN cloud and specify the sites, users, and rules to be associated with the VPN. Each connection is then configured based on the configuration specified for the VPN cloud. The hierarchical organization thus facilitates the setup of a VPN with a large number of sites.

The network administrator preferably adds a new VPN cloud by actuating an add button 280. In response, the policy server 122 automatically creates the sites node 272, users node 274, and rules node 276 under the VPN cloud. The administrator then specifies the sites and users in the VPN.

According to one embodiment of the invention, the rules node 276 initially includes a default VPN rule 278 corresponding to the policy settings selected by the network administrator during setup of the policy server 122. The default VPN rule 278 allows unrestricted access between the hosts in the VPN.

The administrator may implement the access control within the VPN cloud by deleting the default rule 278 and adding specific firewall rules to the VPN. Such firewall rules allow the administrator to have fine grained access control over the traffic that flows through the VPN, all within the realm of the encrypted access provided by such VPN. The firewall rules are applied to the cleartext packet after it is decrypted or before it is encrypted.

According to one embodiment of the invention, the administrator selects the default rule 278 to effectuate such changes to the default rule. Selection of the default rule invokes a graphical user interface similar to the one illustrated in FIG. 8. The network administrator then fine tunes the access to the VPN by defining the firewall rules applicable to the VPN. The parameters in these firewall rules are preferably identical to the general firewall rules illustrated in FIG. 8.

Once a VPN cloud is configured, VPN membership information is dynamically created by the policy enforcers 124, 126 in the VPN. In this regard, each VPN site includes a tag identifying the hosts included in the site. At runtime, the policy enforcers 124, 126 for the respective sites associate IP addresses to the tag identifying the hosts in each site. This allows the IP addresses to be dynamically discovered without requiring static configuration of the IP addresses.

After the creation of the membership tables, any changes in the routing information is detected and notified to the member policy enforcers using a publish/subscribe process. The actual changes are retrieved by a policy enforcer by querying the LDAP database on the particular network that corresponds to the changed routing information.

Figure 15:
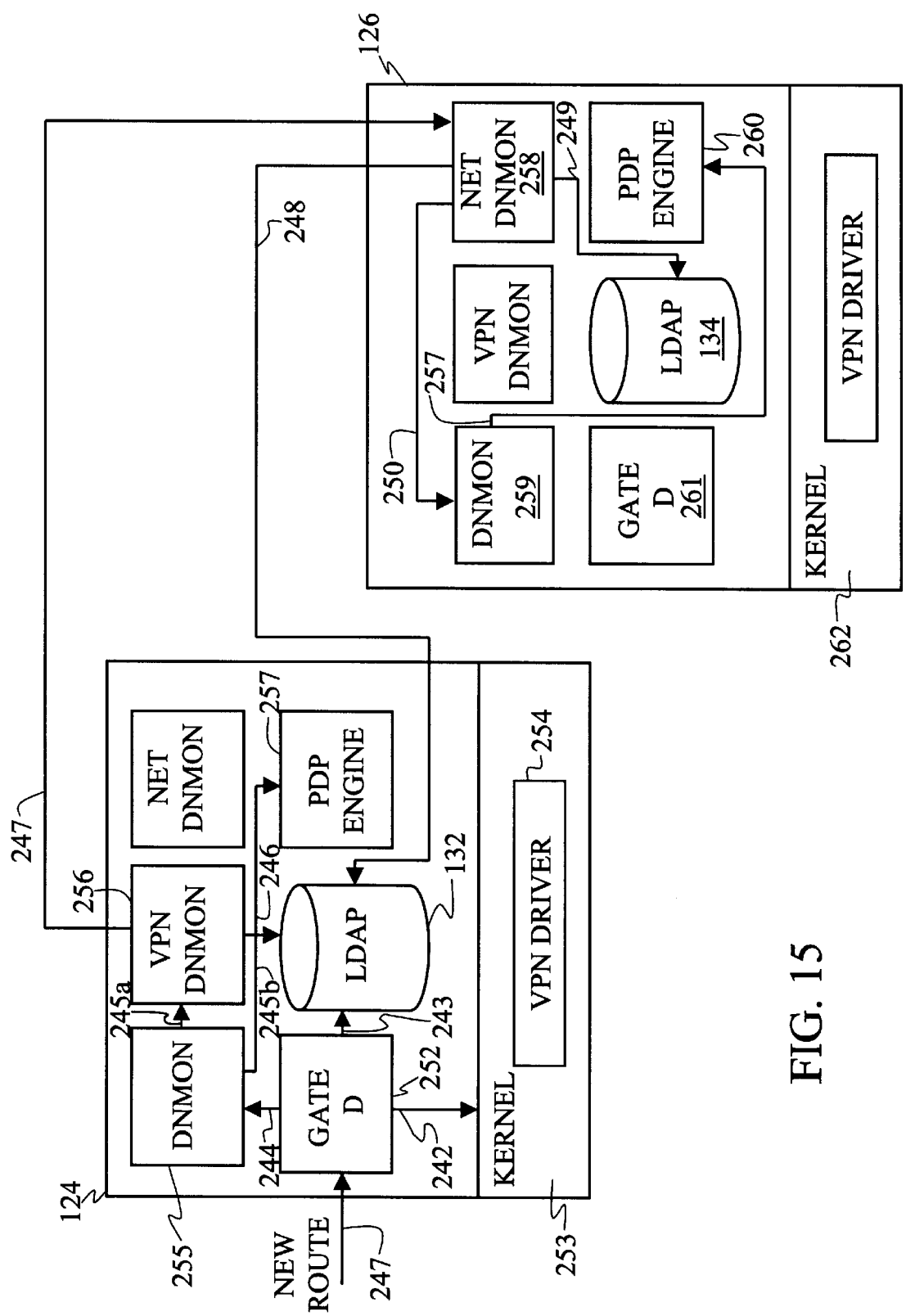
FIG. 15 is a schematic functional block diagram of policy enforcers updating their respective VPN membership information.

FIG. 15 is a schematic functional block diagram of policy enforcers 124, 126 at opposite ends of a VPN tunnel updating their respective routing information. As illustrated in FIG. 15, each policy enforcer 124, 126 includes a gated module 252, 261 configured as a daemon to run one or more routing protocols for exchanging routes on the network. Such routing protocols may include RIPv1, RIPv2, OSPF, and the like.

When a network administrator wishes to add a new route to the private local network 102 connected to policy enforcer 124, the administrator submits, in step 241, the new route to a gated module 252 in the policy enforcer 124. This is typically done by configuring a downstream of the policy enforcer to have an additional network. This information is then propagated by standard routing protocols to the gated module 252 of the policy enforcer 124. For example, the policy server 122 may publish the new route to the policy enforcer 124 with which the new route is to be associated. The route may be specified, for example, by an LDAP statement such as "LAN_Group@PR1," which specifies a new route from a policy enforcer PR1 to a LAN named LAN_Group. The gated module 252, in step 242, writes the new route to a kernel 253 of the policy enforcer including a VPN driver 254 so that the policy enforcer 124 can properly direct appropriate messages along the new route. Furthermore, the gated module 252, in step 243, writes the new route to its LDAP database 132.

The gated module 252 also provides, in step 244, the name of the new route to a distinguished name monitor (DNMonitor) daemon 255 configured to listen for updates in the LDAP database 132. The DNMonitor in turn notifies, in steps 245a, 245b, a VPN daemon 256 and a policy deployment point (PDP) engine 257 of the change in the LDAP database 132. The PDP engine then updates the modules that enforce the policies, with the change.

The VPN daemon 256, in step 246, uses the route name to access the LDAP database 132 to get the complete route information, a list of all VPNs to which the new route belongs, and a list of all other policy routers connected to those VPNs. In step 247, the VPN daemon 256 proceeds to send the new route name to each of the other policy routers.

When policy router 126 receives a new route name from policy router 124, its network daemon 258, in step 248, accesses the LDAP database 132 in the sending policy router 124 to obtain the complete new route information. If the new route belongs to more than one VPN and has different parameters for the different VPNs, routers on the different VPNs retrieve different information corresponding to the individual VPNs.

In step 249, the network daemon 258 writes the new route information obtained in its own LDAP database 134 and provides it to its own DNMonitor module. As in the sending policy router 124, the DNMonitor module 259 in the receiving policy router 126 provides the new route information to its PDP engine 260 for updating its kernel 262 with the latest changes.

Although FIG. 15 has been described in connection with addition of a route to a policy enforcer and its associated VPNs, it should be readily apparent to those skilled in the art that essentially the same techniques may be applied to deletion of a route (for example, if a network component becomes inoperative or incommunicative), or change of a route (the policy router may recognize that a route already exists in a different form and simply overwrite it). In this way, the VPN system or systems can dynamically maintain routing information between its policy enforcers with minimal intervention by the system administrator.

V. Virtual Private Network Having Automatic Updating of Client Reachability Information Remote users communicate over the public Internet 108 with the other members of the VPN behind policy enforcers 124, 126, upon presenting appropriate credentials. These remote users access the private networks as VPN clients 140 using a VPN client software. According to one embodiment of the invention, the system allows the remote user to download a self-extracting executable which, upon execution, installs both the VPN client software and VPN reachability information unique to the remote user in the user's remote terminal.

Each policy enforcer 124, 126 preferably maintains a copy of the self-extracting executable of the VPN client software including a setup program and VPN reachability configuration template. The setup program allows the VPN client software to be installed on the VPN client 140. When downloading the self-extracting executable, the configuration template is replaced with the VPN reachability information that is specific to the downloading user.

According to another embodiment of the invention, the system allows the VPN client 140 to download a self-extracting executable which, upon execution, only installs the VPN reachability information that is unique to the user. According to this embodiment, the VPN client software is already installed on the VPN client 140. In this scenario, the setup program allows the installation of the reachability information that is specific to the downloading user, on the VPN client 140.

According to a third embodiment of the invention, the system allows the VPN client 140 to automatically download the VPN reachability information each time it connects to the policy enforcer 124, 126. Thus, VPN reachability information is kept up-to-date for each VPN client 140. Once a VPN session is established, the connection between the VPN client 140 and the policy enforcer is assumed to already be secure. The VPN client preferably makes a common gateway interface (CGI) query to a web server running on the policy enforcer, and downloads the current VPN reachability information from the corresponding LDAP database.

Figure 16:
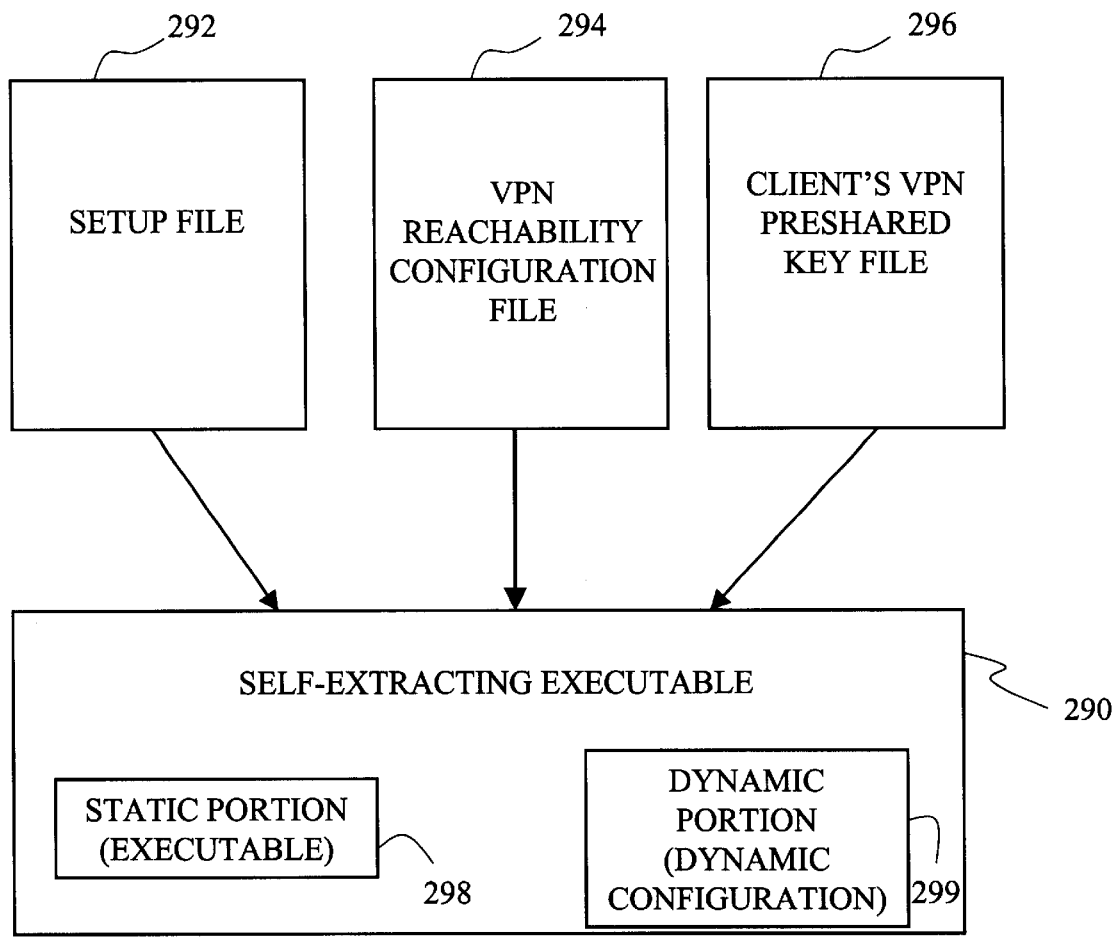
FIG. 16 is a block diagram of components in a self-extracting executable for downloading by a remote VPN client.

FIG. 16 is a block diagram of components in a self-extracting executable 290 according to one embodiment of the invention. The self-extracting executable 290 may be created using commercially available tools such as the INSTALLSHIELD EXEBUILDER of InstallShiled Software Corporation of Schaumburg, Ill.

The self-extracting executable 290 preferably includes an executable setup file 292 for installing the VPN client software and/or the VPN configuration information. The setup file 292 preferably forms a static portion 298 of the self-extracting executable since this information does not change based on the downloading VPN client. The self-extracting executable 290 further includes VPN configuration file templates for the VPN reachability information 294 and the VPN client's preshared key information 296. The VPN reachability information 294 and the VPN client's preshared key 296 preferably form a dynamic portion 299 of the self-extracting executable 290 since this information changes based on the downloading VPN client. The self-extracting executable 290 is then saved as a template file in the policy enforcers 124, 126 and is ready to be downloaded by the remote users.

Figure 17:
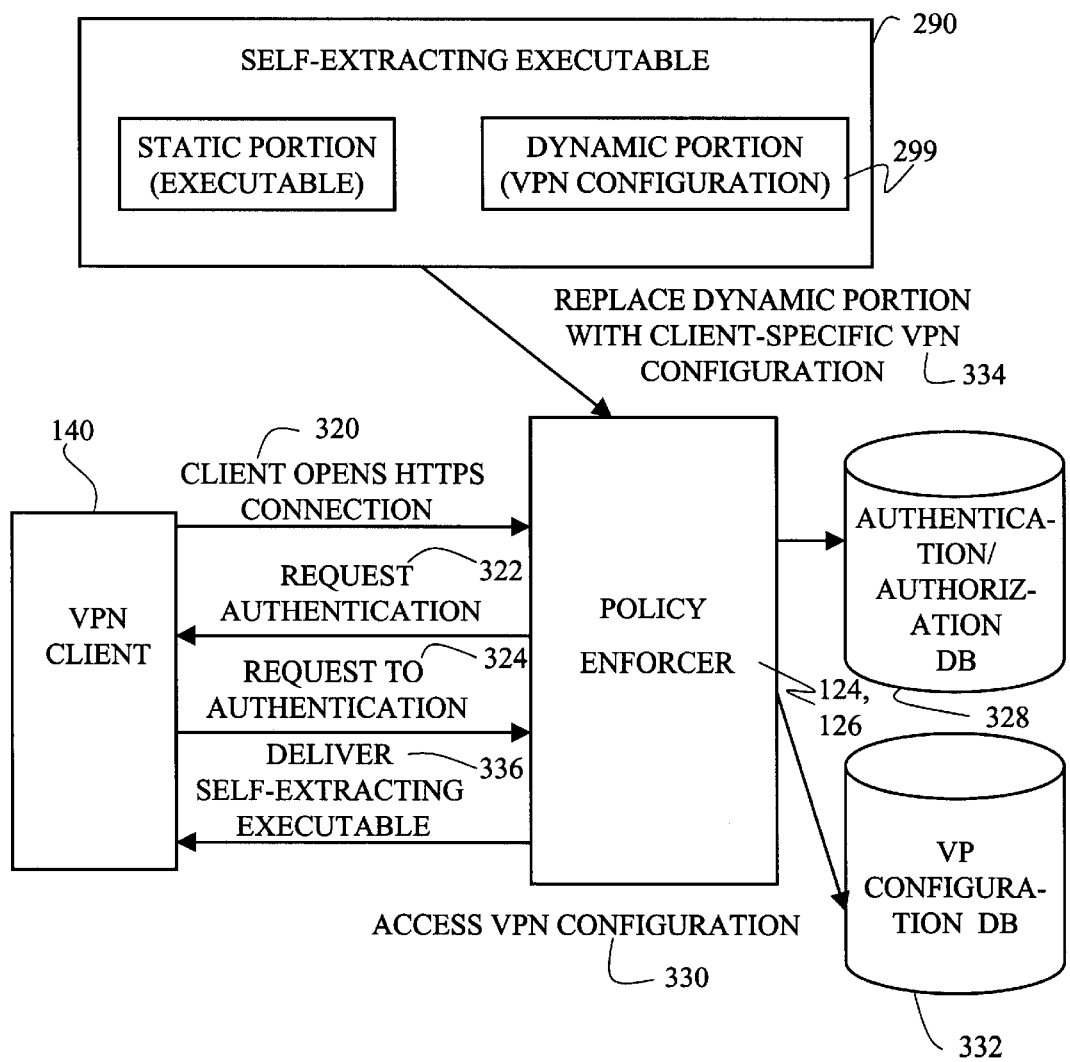
FIG. 17 is a functional block diagram for downloading the self-extracting executable of FIG. 16.

FIG. 17 is a functional block diagram for downloading the self-extracting executable 290 of FIG. 16 according to one embodiment of the invention. In step 320, a new VPN client 140 first establishes a secure communication session with the policy enforcer 124, 126 to download the self-extracting executable 290. Preferably, this is accomplished via an HTTPS protocol session on the VPN client's web browser or the like. In steps 322 and 324, the policy enforcer engages the VPN client in an authentication procedure where the policy enforcer requests, and the VPN client provides, his or her user name and password. In step 326, the policy enforcer compares the provided information with entries in its VPN client database 328. If the information is correct, the policy enforcer finds appropriate preshared keys for the user, and in step 330, also determines the VPN reachability information of the client from a VPN configuration database 332. The VPN client database 328 and VPN configuration database 332 may reside as part of a single LDAP database 312, 314 managed by the policy enforcer 124, 126, or may constitute separate LDAP databases.

In step 334, the policy enforcer replaces the dynamic portion 299 of the self-extracting executable 290 with the VPN reachability information and preshared key that is unique to the VPN client. The newly generated self-extracting executable is then downloaded to the VPN client 140 in step 336. When the executable is run, it either installs the VPN client software and/or the VPN reachability information.

Similar techniques may also be used for downloading a new and updated copy of the VPN configuration information to the VPN client each time the client connects to the policy enforcer and negotiates a session key. In addition, the user may obtain the latest configuration of the VPN network by expressly requesting the policy enforcer for such information. Thus, the VPN client need not be reinstalled and reconfigured each time updates are made to the VPN reachability information.

VI. Integated Policy Enforcer

According to one embodiment of the invention, the functionalities of the policy enforcer 124, 126 for policy enforcement are partitioned for effective hardware implementation. However, it should be apparent to one skilled in the art that some or all of the functionalities may be implemented in software, hardware, or various combinations thereof.

Figure 18:
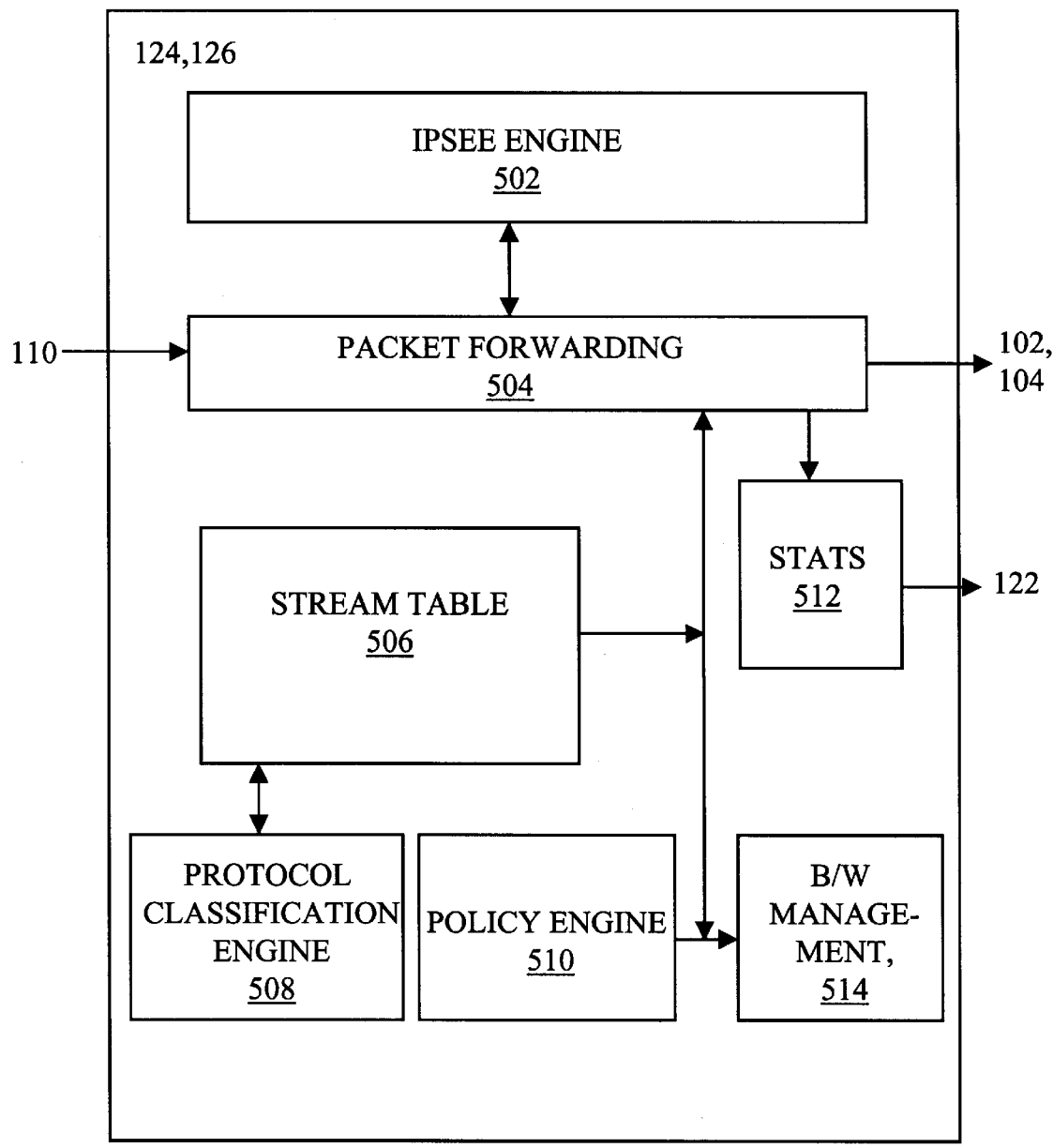
FIG. 18 is a schematic block diagram of a policy enforcer in the policy management system of FIG. 1.

FIG. 18 is a schematic block diagram of the policy enforcer 124, 126 illustrating the partitioning of the various functionalities according to one embodiment of the invention. The policy enforcer includes an Internet protocol security (IPSec) engine 502 for performing security and authentication functions in implementing, for instance, virtual private networks. A stream table 506 assembles the packets passing through the policy enforcer into streams. A protocol classification engine 508 decodes the protocols used in forwarding the packets. A policy engine 510 enforces policies for the packets based on the policy settings stored in the policy database 132, 134. A packet forwarding module 504 receives packets from the public Internet via the router 110 and buffers, forwards, or drops the packets based on the policies being enforced. A bandwidth management module 514 provides bandwidth shaping services to the packets being forwarded based on the bandwidth settings stored in the policy database 132, 134.

In practice, an incoming packet is matched against the stream table 506 for determining if a matching entry already exists in the table. If not, a new entry is added. The stream table preferably includes enough portions of the packet to uniquely identify a stream. For example, in enforcing policies on IP layer three through layer four traffic, the stream table may store a source IP, destination IP, source port, destination port, and protocol number of the incoming packet.

The protocol classification engine 508 takes the new stream and obtains a detailed protocol decode for the stream. The policy engine 510 is then queried for the policy rules to be applied to the stream. Based on the policy rules returned by the policy engine 510, the packet forwarding module 504, IPSec engine 502, and/or the bandwidth management module 514 process the streams accordingly. The processing may be recursive until the packets in the stream have had all the actions specified by the policy rule set applied to them.

The policy enforcer also includes a statistics module 512 for collecting statistics on the packets forwarded through the local network as well as other status and resource usage information, and provides the same in logs and archives for sending to the policy server 122. According to one embodiment of the invention, the statistics module 512 keeps running byte counts of the packets passing through the network 102, 104. These byte counts may be automatically sorted by classes, such as classes based on certain resources (e.g. users, hosts, services), as well as by bytes that are blocked by policies and exceptions, such as firewall policies. In this regard, the statistics module 512 maintains in a cache a state table including a list of resources involved for each connection allowed through the firewall. For every packet flowing through the connection, the statistics module increments the packet and byte count for each of the resources in the list. The statistics module 512 then forwards the organized information to the policy server 122 which enters the information directly into tables organized by classes and aged out periodically.

Figure 19:
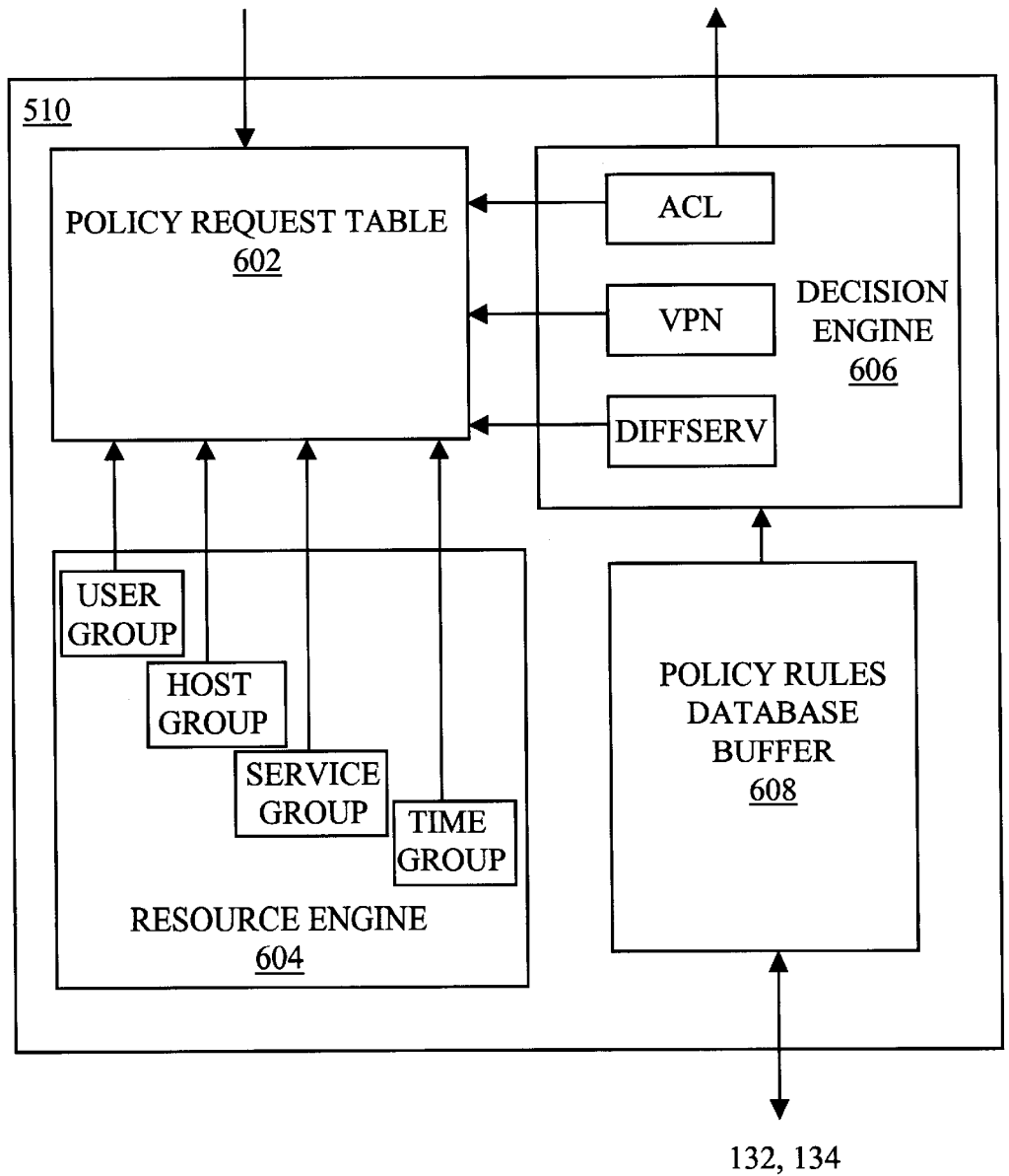
FIG. 19 is a more detailed schematic block diagram of a policy engine in the policy enforcer of FIG. 18.

FIG. 19 is a more detailed schematic block diagram of the policy engine 510 according to one embodiment of the invention. The policy engine 510 includes a policy request table 602 that acts as a queue for all the policy decision requests. In this regard, the portion of the packet matching the information stored in the stream table 506 is presented to the policy engine 510 in the form of a policy request. The policy request is then queued in the policy request table 602.

A resource engine 604 maintains an up-to-date mapping of resource group names to member mappings. A policy rules database buffer 608 stores a current policy rule set to be applied by the policy engine 510. The policy rules stored in the buffer 608 are preferably in the original group-based rule specification format. Thus, the buffer 608 stores a rule created for a group in its group-based form instead of instantiating a rule for each member of the group.

A decision engine 606 includes logic to serve the incoming policy decision requests in the policy request table 602 by matching it against the policy rule set in the policy rules database buffer 608 based on the actual membership information obtained from the resource engine 604. The relevant group-based rule matching the traffic is then identified and decision bits in the stream table set for enforcing the corresponding actions. The decision bits thus constitute the set of actions to be performed on the packets of the stream. All packets matching the streams are then processed based on these decision bits. The decision engine may also specify an access control list (ACL) including a set of rules that allow/deny traffic, a DiffServ standard for providing a quality of service level to the traffic, and/or VPN implementation information.

Figure 20:
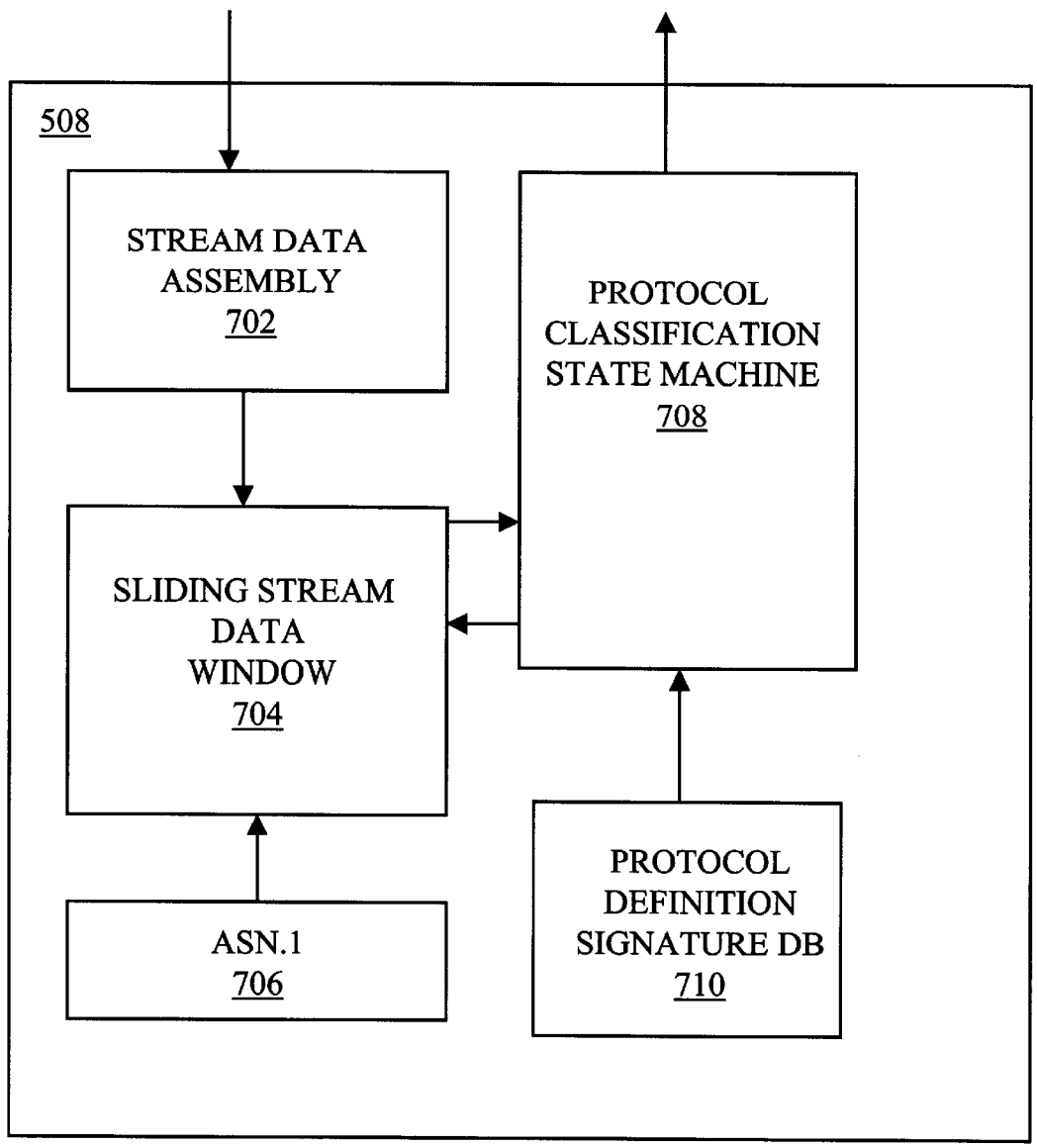
FIG. 20 is a more detailed schematic block diagram of a protocol classification engine of the policy enforcer of FIG. 18.

FIG. 20 is a more detailed schematic block diagram of the protocol classification engine 508 according to one embodiment of the invention. As illustrated in FIG. 20, the protocol classification engine 508 includes a stream data assembly 702, a sliding stream data window 704, an ASN.1 block 706, a protocol classification state machine 708, and a protocol definition signature database 710. The stream data assembly 702 extracts and re-assembles the data portion of an input packet stream and stores it in the sliding stream data window 704. Preferably, the sliding stream data window follows first-in-first-out protocols. The ASN.1 decoder further decodes the data stream, if needed, per conventional ASN.1 encoding/decoding standards. The protocol classification state machine 708 then matches the fully re-assembled and decoded data against the protocol definition signature database 710. This database 710 preferably holds a mapping of protocol names to data patterns to be found in the data stream. The matched protocol is then returned to the stream table 506.

Thus, the protocol classification engine 508 provides extensive layer three through layer seven protocol decode and packet classification, including complete identification of dynamic streams using a dynamically updated signature database compiled from scripted protocol definitions. As new protocols are defined in the future and/or users create their own custom applications with custom protocols, a need may arise to add recognition of these protocols to the protocol classification engine. The described protocol classification engine architecture allows such additions by simply adding a new scripted definition of the new protocol to the protocol classification engine without having to change the design each time a new protocol is added. This allows for custom protocol support and future protocol extensibility.

Figure 21:
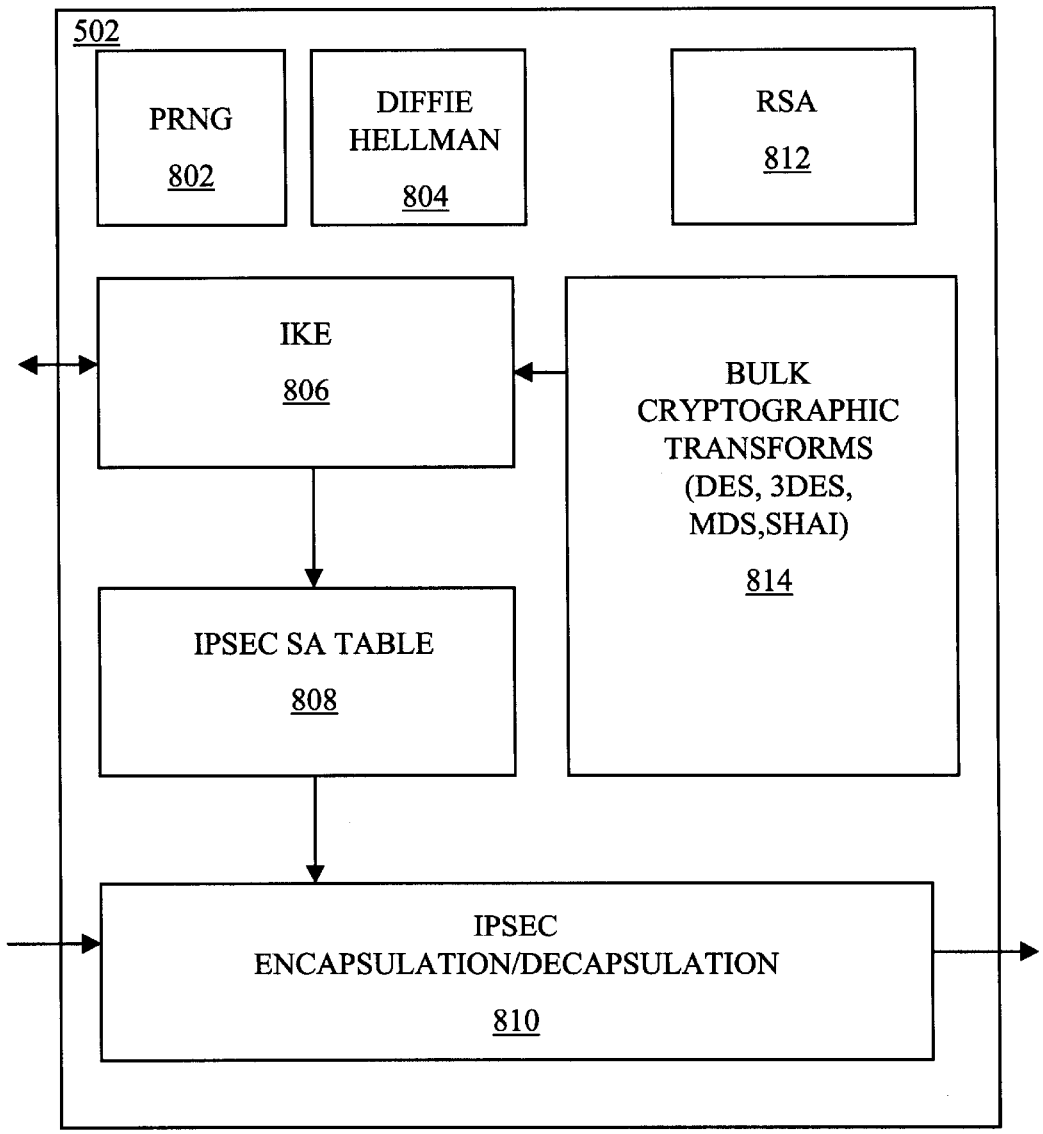
FIG. 21 is a more detailed schematic block diagram of an Internet protocol security engine in the policy enforcer of FIG. 18.

FIG. 21 is a more detailed schematic block diagram of the IPSec engine 502 according to one embodiment of the invention. As illustrated in FIG. 21, the IPSec engine 502 includes a Pseudo-Random Number Generator (PRNG) function 802 for generating random numbers used for cryptographic key generation according to well known methods. A Diffie Hellman 804 and RSA 812 blocks implement the corresponding asymmetric public key encryption/decryption/signature algorithms which are also well known in the art. An IKE block 806 communicates with an IPSec SA table 808 for implementing standard ISAKMP/Oakley (IKE) key exchange protocols. A cryptographic transforms block 814 implements standard symmetric encryption/decryption algorithms. An IPSec Encapsulation/Decapsulation block 810 performs standard encapsulation/decapsulation functions. Accordingly, the IPSec engine 502 provides mature, standards-based IKE/IPSec implementation with public key certificate support and necessary encryption/decryption functionality for packets passing through the private local networks 102, 104.

VII. Network Policy Logs and Statistics Aggregation

Referring again to FIG. 3, the log collecting and archiving module 304 collects information about the status and usage of resources from the policy enforcers 124, 126 as well as from the management module 302, and stores them in the archive database 318. The policy server reports module 316 then uses the collected logs and archives to generate reports in an organized report format.

According to one embodiment of the invention, each policy enforcer 124, 126 maintains a log file with information collected about the flow of traffic through the policy enforcer as well as the status and usage of resources associated with the policy enforcer. All the log files follow a predefined common log format, preferably designed to create compact logs.

FIG. 22 is a schematic layout diagram of such a log format according to one embodiment of the invention. Each log entry includes a timestamp 820 in the format yyyymmddhhmmss, indicative of the year, month, date, hours, minutes, and seconds in which the log entry was created. A service field 822 indicates the type of service rendered by the policy enforcer 124, 126. Such services include VPN, FTP, Telnet, HTTP, packet filter, bandwidth, and the like. Each log entry further includes a source IP address and port 824 indicating the source from where a packet was received, as well as a destination IP address and port 826 indicating the destination to which the packet was forwarded.

A user ID field 828 identifies the user transmitting the packet. The user ID may be mapped to an entry in the LDAP database 130, 132, or 134 for obtaining additional details about the user.

A status field 830 indicates the status of an operation and may include a result code, error code, and the like. For example, for a packet filter service, the status field may include a result code "p" if the packet was passed or code "b" if the packet was blocked.

An operation field 832 indicates codes for a type of operation conducted by the service. For instance, operations for a VPN service may include sending packets and receiving packets. Operations for an FTP service may include GET and PUT operations. Operations for an HTTP service may include GET and POST operations.

In addition to the above, each log entry includes an in-bytes field 834 indicative of the number of bytes the policy enforcer received as a result of the activity, and an out-bytes field 836 indicative of the number of bytes transferred from the policy enforcer. Furthermore, a duration field 838 indicates the duration (e.g. in seconds) of the activity.

Certain fields of a particular log entry may be left blank if not applicable to a particular service. For instance, for an FTP download. Where there is no outgoing traffic, the out-bytes field is left blank. Furthermore, additional fields may be added based on the type of service being logged. For instance, for an HTTP activity, the URL that is accessed is also logged in the log entry. The additional fields are preferably appended to the end of the standard log format.

A person skilled in the art should recognize that additions, deletions, and other types of modifications may be made to the log format without departing from the spirit and the scope of the invention as long as the log format is common to all the policy enforcers and is aimed in creating compact logs.

The log files created by the policy enforcers 124, 126 are transferred to the policy server 122 based on archive options set by the policy server. In this regard, the network administrator specifies a threshold size for the logs created by the policy enforcers upon selection of the policy server archive option 752 of FIG. 9. When the log file exceeds the specified size, it is sent to the policy server 122. Preferably, the logs are transferred to the policy server 122 at least once a day even if the threshold size has not been exceeded. The logs may also be archived locally at the policy enforcer if so specified by the network administrator.

Once the policy server 122 receives the logs, it is stored in the archive database 318 preferably taking the form of an SQL database. The policy server reports module 316 queries this database to generate reports for each policy enforcer 124, 126. In addition, the logs may be exported in a format that may be interpreted by commercially available products such as WEBTRENDS, manufactured by WebTrends Corporation of Portland, Oreg.

The reports created by the reports module 316 include summary usage reports for the various resources including policy enforcers, users, services, hosts, and VPNs. For instance, the reports may include VPN summary reports, bandwidth summary reports, packet filter reports, and the like, for each policy enforcer.

The reports preferably show usage of each of the resources over a period of time. The start and the end date for the report may be specified by the user. The user may further drill down on the time dimension and on the resource dimension for viewing specific times and specific resources. For instance, in creating the packet filter reports, the user may indicate a start and end time, source IP address, source port, destination IP address, and destination port. All packets meeting these criteria are then fetched from the archive database 318 and shown in a packet report.

VIII. Method for Selective LDAP Database Synchronization

According to one embodiment of the invention, the databases 130, 132, 134 in the unified policy management system of FIG. 1 are LDAP databases storing policy management information including policies for firewall, VPNS, bandwidth, administration, user records, network records, services, and the like. As described above, the LDAP directory service model is based on entries where each entry is a collection of attributes. Entries are arranged in a tree structure that follows a geographical and organizational distribution. Entries are named according to their position in the hierarchy by a distinguished name (DN).

The policy server 122 preferably stores the policy management information for all the policy enforcers in the policy server database 130. This information is organized in the databases 130 as one or more DNs with corresponding attributes. Appropriate portions of the policy server database are then copied to the policy enforcer databases 132, 134.

Figure 23:
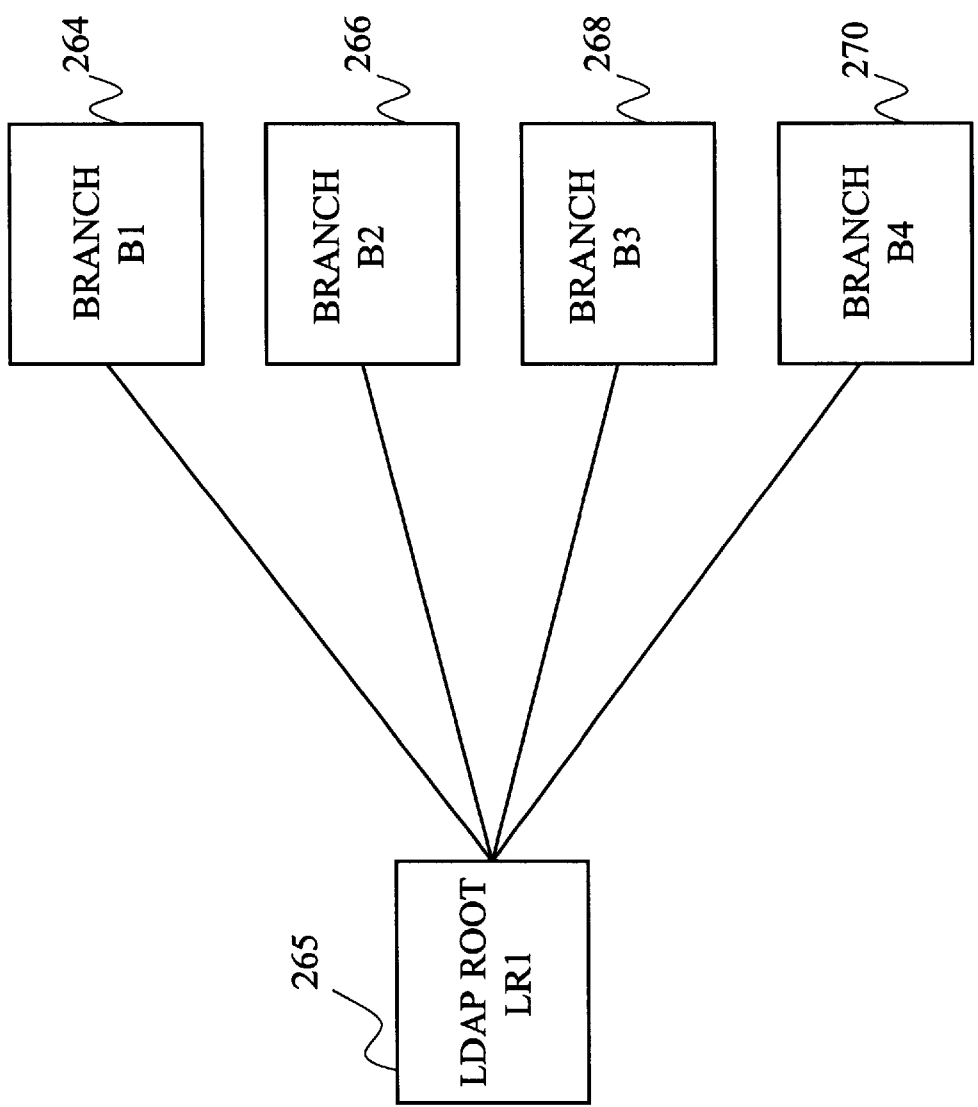
FIG. 23 is a block diagram of an LDAP tree structure according to one embodiment of the invention.

FIG. 23 is a block diagram of an LDAP tree structure including an LDAP root 265 and a plurality of branches 264, 266, 268, 270. According to one example, the policy server 122 maintains in the policy server database 130 branches 264 and 266 with policy management information for all the policy enforcers 124, 126. Each of the policy enforcers 124, 126 also maintain portions of the branches 264 and/or 266 in their respective policy enforcer databases 132, 134 as sub-trees of the policy server database 130. The portions of the branches maintained by each policy enforcer 124, 126 preferably relates to the configuration information for that policy enforcer as well as some additional information about the other policy enforcers. This additional information is used to communicate with the other policy enforcers.

The policy server 122 may further maintain branch 268 storing information used only by the applications running on the server and not shared with any of the policy enforcers 124, 126. Likewise, policy enforcers 124, 126 may maintain a portion of branch 268 containing information used only by the applications on each of the policy enforcers and not shared elsewhere. Typically, the data stored in branch 268 is dynamically generated and used by the applications running on the corresponding server or agent.

Branch 270 is preferably only included in the LDAP tree for the policy server database 130 and stores logged policy management changes that may be propagated to the policy enforcers 124, 126. Such changes may include, for example, addition, deletion, or modifications of a user on a device, VPN cloud, bandwidth policy, or firewall policy made by the network administrator via the various graphical user interfaces described above. Such changes result in the updating of the policy database 130 where the corresponding DN of the LDAP tree is added, deleted, or modified. The policy server 122 further creates a log of the changes and stores them in branch 270 for later distribution to the policy enforcers 124, 126.

Figure 24:
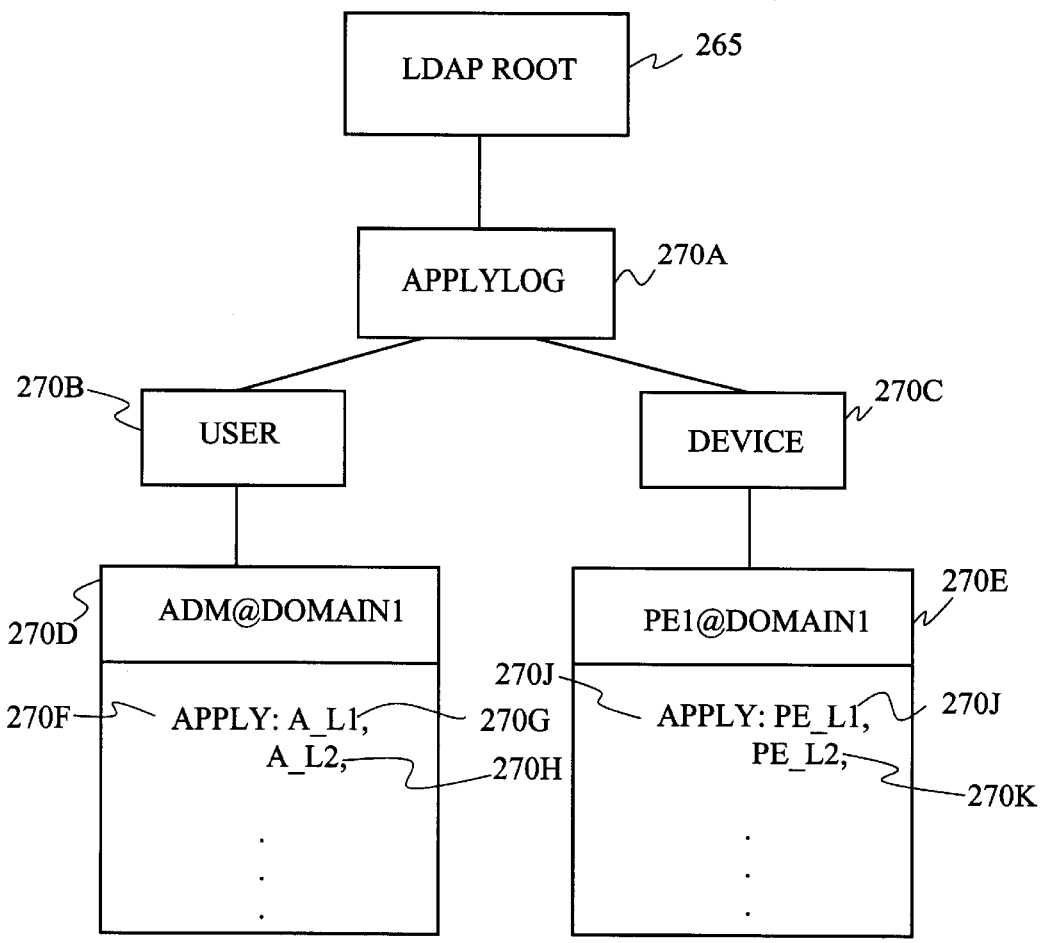
FIG. 24 is a more detailed block diagram of a branch of the LDAP tree of FIG. 23.

FIG. 24 is a more detailed block diagram of branch 270 of the LDAP tree of FIG. 23. The LDAP root 265 includes an ApplyLog 270*a* entry which in turn includes a user log entry 270*b* and a device log entry 270*c*. The user log entries include specific administrator log entries identified by specific DNs 270*d* for reflecting the changes made by the particular administrators. The device log entry 270*c* includes specific device log entries identified by specific DNs 270*e* reflecting the changes that are to be distributed to the particular policy enforces 124, 126. Preferably, the changes made by the administrators are propagated to the policy enforcers 124, 126 upon actuation of an apply button such as the apply button 417 illustrated in FIG. 6.

Figure 25:
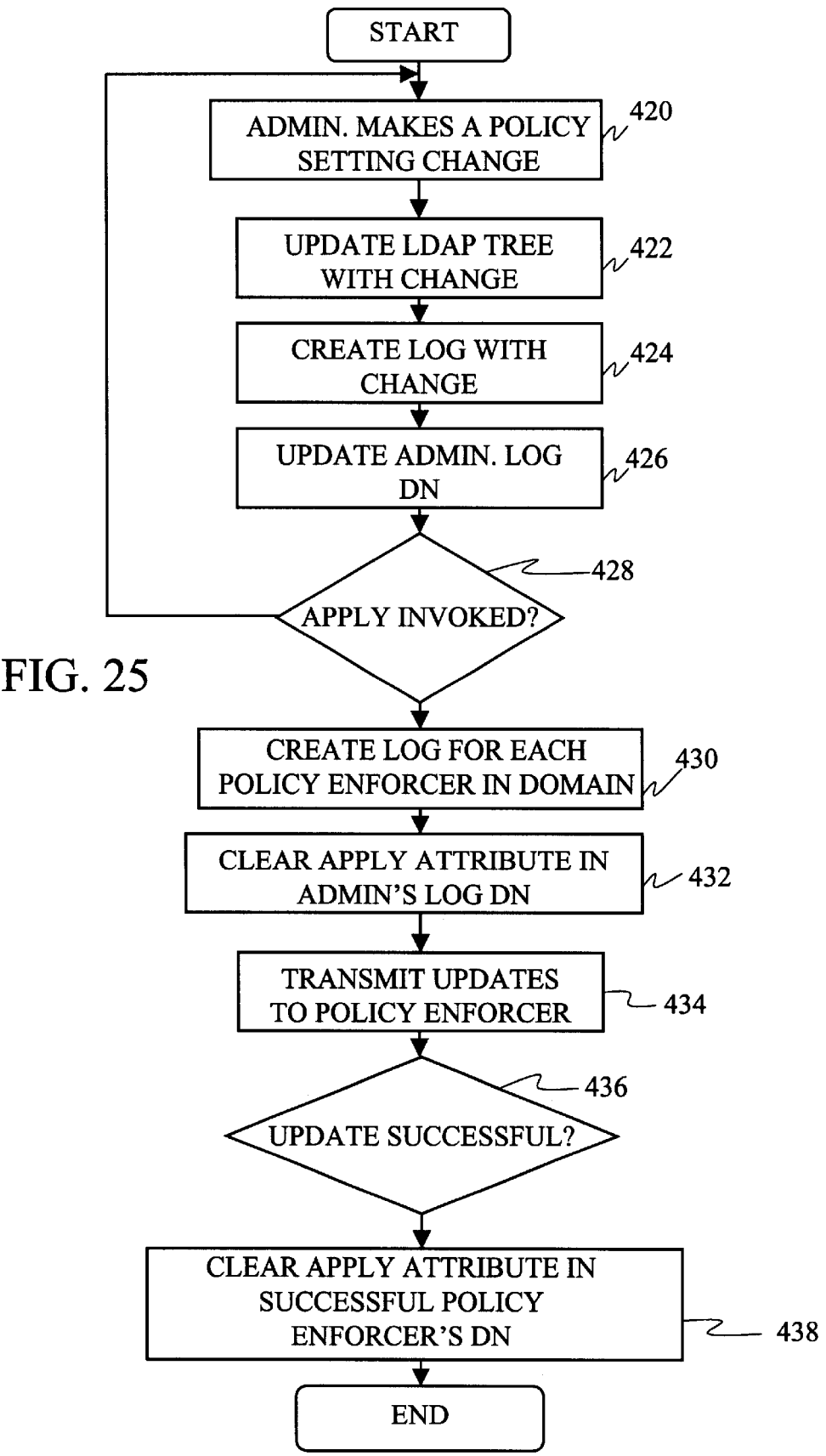
FIG. 25 is a flow diagram for logging and propagating LDAP changes to policy enforcers.

FIG. 25 is a flow diagram for logging and propagating LDAP changes to the policy enforcers according to one embodiment of the invention. In step 420, a particular network administrator makes a policy setting change. According to one example, the administrator is administrator "adm" working in the domain "domain1," and the change is the addition of a new user on a device.

In step 422, the change made to the administrator is reflected in the policy server database 130. In this regard, branches 264 and 266 of the LDAP tree are modified accordingly to reflect the change in the policy setting. Additionally, in step 424, the policy server 122 creates a log of the changes for the administrator for later processing and sending to the appropriate policy agent. In step 426, the policy server 122 updates the administrator's log DN 270*d* to reflect the change. In the above example and as illustrated in FIG. 24, if the log created is named "A_L1," the policy server 122 updates the DN 270*d* for "adm" at "domain1" to create an attribute "apply" 270*f* that has the value "A_L1" 270*g*. Other changes made by the administrator are reflected in separate logs (e.g. "A_L2," "A_L3") and appended to the existing value of the apply attribute in the administrator's log DN 270*d*.

In step 428, the policy server 122 checks whether the changes made by the administrator are to be propagated to the appropriate policy enforcers 124, 126. As discussed above, the changes are preferably propagated upon actuation of an apply button from the administrator's graphical user interface.

If the apply button has been actuated, the policy server creates, in step 430, a log for each policy enforcer to whom the change is to be transmitted. In this regard, the policy server 122 collects all the changes made by the administrator as reflected in the values 270*g*, 270*h* of the apply attribute 270*f* of the administrator's log DN 270*d*. These changes are processed for each policy enforcer belonging to the administrator's domain. Such processing preferably involves picking the relevant changes and suitably modifying the DNs for the policy enforcer's LDAP. Such suitable modifications may be necessary, for instance, due to the differences in the tree structures in the policy server database 130 and the policy enforcer databases 132, 134. For instance, a change in the administrator's log may contain a DN that specifies the domain name of the policy enforcer. In applying this change to the policy enforcer, the domain name would not be specified in the DN since the policy enforcer's tree structure does not include a domain name.

The changes suitably modified for each policy enforcer's LDAP are then stored in a device log. Each policy enforcer's log DN 270*e* is then modified to reflect the change to be transmitted to the particular policy enforcer. In the above example and as illustrated in FIG. 24, if the device log created is named "PE_L1," the policy server 122 updates the DN 270*e* for the particular policy enforcer "PE1" at "domain1" to create an attribute "apply" 270*i* that has the value "PE_L1" 270*j*.

In step 432, the apply attribute 270*f* for the administrator's log DN 270*d* is then deleted from the LDAP tree. In step 434, the changes collected for each policy enforcer, as reflected in the values 270*j*, 270*k* of the apply attribute 270*i* of the policy enforcer's log DN 270*e*, are transmitted to the policy enforcer for updating its database 132, 134. The changes are sent to the policy enforcers preferably over the HTTPS channel.

In step 436, the policy server 122 checks whether the updates have been successful. In this regard, the policy server 122 waits to receive an acknowledgment from the policy enforcer that the updates have been successfully completed. Upon a positive response from the policy enforcer, the policy server 122 deletes the apply attribute 270*e* for the policy enforcer's log DN 438. Otherwise, if the update was not successful (e.g. because the policy enforcer was down), the apply log is re-sent the next time another apply function is invoked. Alternatively, the failed policy enforcer transmits a request to the policy server 122 of the log of non-applied changes when it rejoins the network (e.g. by rebooting).

IX. State Transition Protocal for High Availability Units

According to one embodiment of the invention, the policy server 122, policy enforcers 124, 126, as well as other network devices may be configured for high availability by maintaining a backup unit in addition to a primary unit.

Figure 26:
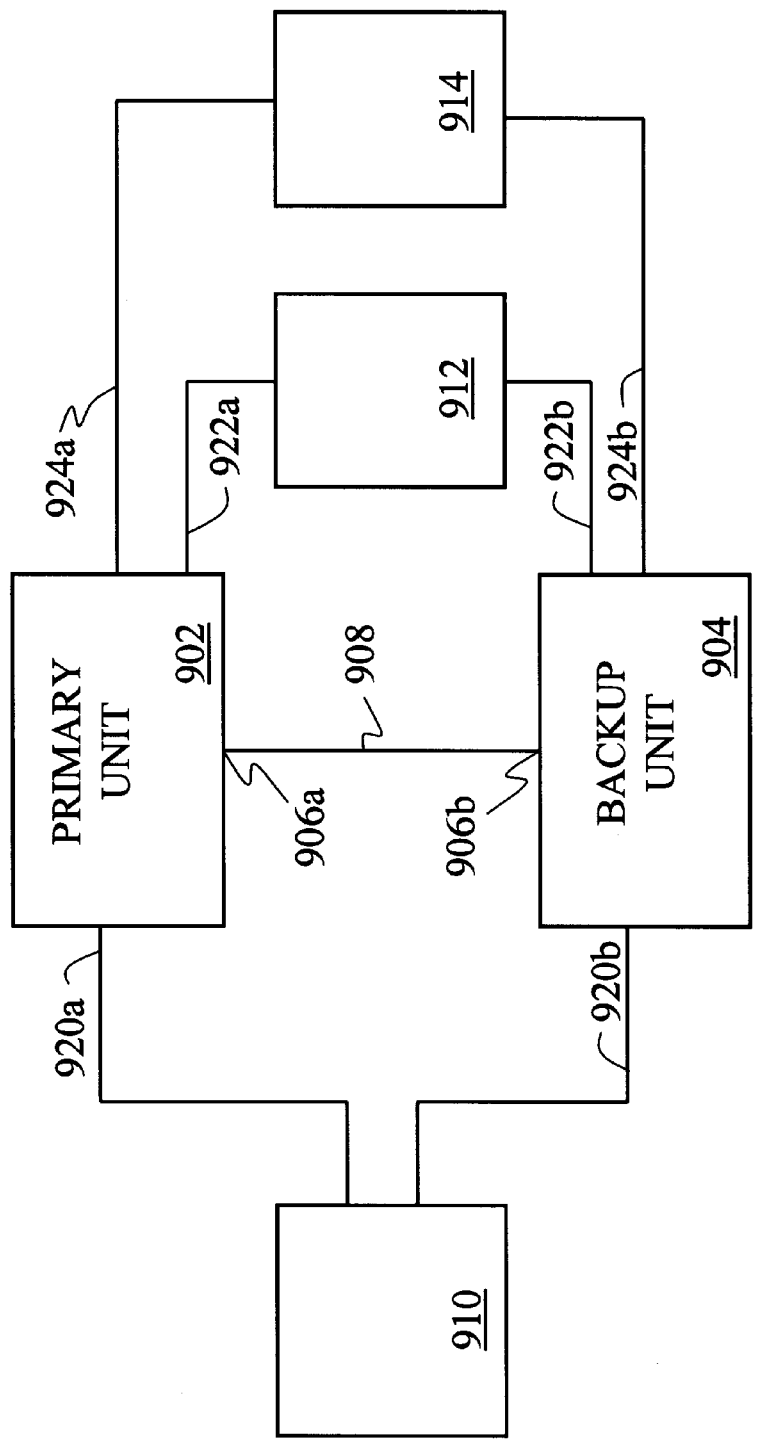
FIG. 26 is a schematic block diagram of a high availability system including a primary unit and a backup unit.

FIG. 26 is a schematic block diagram of a high availability system including a primary unit 902 and a backup unit 904. The two units 902, 904 communicate with each other by exchanging heartbeats over parallel ports 906*a*, 906*b* and a cable 908. Such parallel ports 906*a*, 906*b* and cable 908 are conventional components that are commonly available in the art.

The primary unit 902 and the backup unit 904 are each similarly connected to other components 910, 912, 914 via ports 920*a*, 920*b*, 922*a*, 922*b*, 924*a*, 924*b*, respectively. These components 910, 912, 914 may be hubs, switches, connectors, or the like. Because the primary unit 902 and backup unit 904 provide similar services and functions and may be used interchangeably, each unit is preferably connected to the same components 910, 912, 914.

The parallel port cable 908 is preferably a conventional laplink cable designed to connect two parallel ports and allow communications between them. The primary unit 902 and the backup unit 904 preferably communicate with each other via TCP packets over the high-availability ports 906*a*, 906*b*. A point-to-point connection preferably exists between the primary unit 902 and the backup unit 904 over the high-availability ports 906*a*, 906*b*.

The primary unit 902 is preferably responsible for checking the status of its network ports for problems or failures. For example, if the primary unit 902 detects that one of its network ports is inoperable, e.g. port 922*a*, the primary unit 902 then checks whether the corresponding port 922*b* in the backup unit 904 is operational. Upon determining that the corresponding port 922*b* in the backup unit 904 is operational, the primary unit 902 sends a request to the backup unit 904 to take over the system functions as the active unit. The primary unit 902 then relinquishes its role as the active unit and shuts itself down, allowing the backup unit 904 to take on the responsibilities of the primary unit 902. When the primary unit 902 restarts operation, the backup unit 904 receives a request from the primary unit 902 to relinquish its role as the active unit.

When the primary unit 902 is active and does not detect any defects in its ports, it continuously listens on the high-availability port 906*a* to keep track of the status of the backup unit 904. The primary unit 902 continues to listen on the high-availability port 906*a* for signals coming from the backup unit 904. When the backup unit 904 is up and running, it connects to the primary unit 902. Once the connection is made, the backup unit 904 begins sending heartbeats to the primary unit 902. The backup unit 904 continuously sends heartbeats to the primary unit 902 in predetermined intervals. According to one embodiment of the invention, the backup unit 904 sends a "Keep Alive" packet including a KEEP_ALIVE command to the primary unit 902 every one second.

The primary unit 902 responds to the "Keep Alive" packet by changing the command field of the packet to a KEEP_ALIVE_RESP command and re-transmitting the packet to the sender. If the backup unit 904 does not receive a response back from the primary unit 902 for a predetermined period of time (e.g. one second) for one "Keep Alive" packet, the backup unit 904 begins preparing to take over the active role. Preferably, the predetermined period should not be greater less than two consecutive "Keep Alive" packets.

Upon taking the role of the active unit, the backup unit 904 attempts to reestablish a connection with the primary unit 902 at regular intervals to determine whether the problem or failure in the primary unit has been cured. If the problem or failure has been cured, the backup unit 904 relinquishes its control to the primary unit 902 after setting the IP addresses of all the network interface cards to the assigned value.

In situations where the backup unit 904 takes over the active role from the primary unit 902, an alert/alarm is sent to the network administrator indicating such a change. In addition, if the primary unit 902 does not receive heartbeats from the backup unit 904, an alert/alarm is sent to the administrator indicating that the backup unit has failed.

A situation may arise when both the primary unit 902 and the backup unit 904 are fully functional, and the backup unit 904 desires to take over the active role. In this case, the backup unit 904 transmits a shut-down command to the primary unit 902 which then relinquishes control. The backup unit 904 continues its role as the active unit until the primary unit 902 transmits a request to the backup unit 904 to relinquish its active role.

Figure 27:
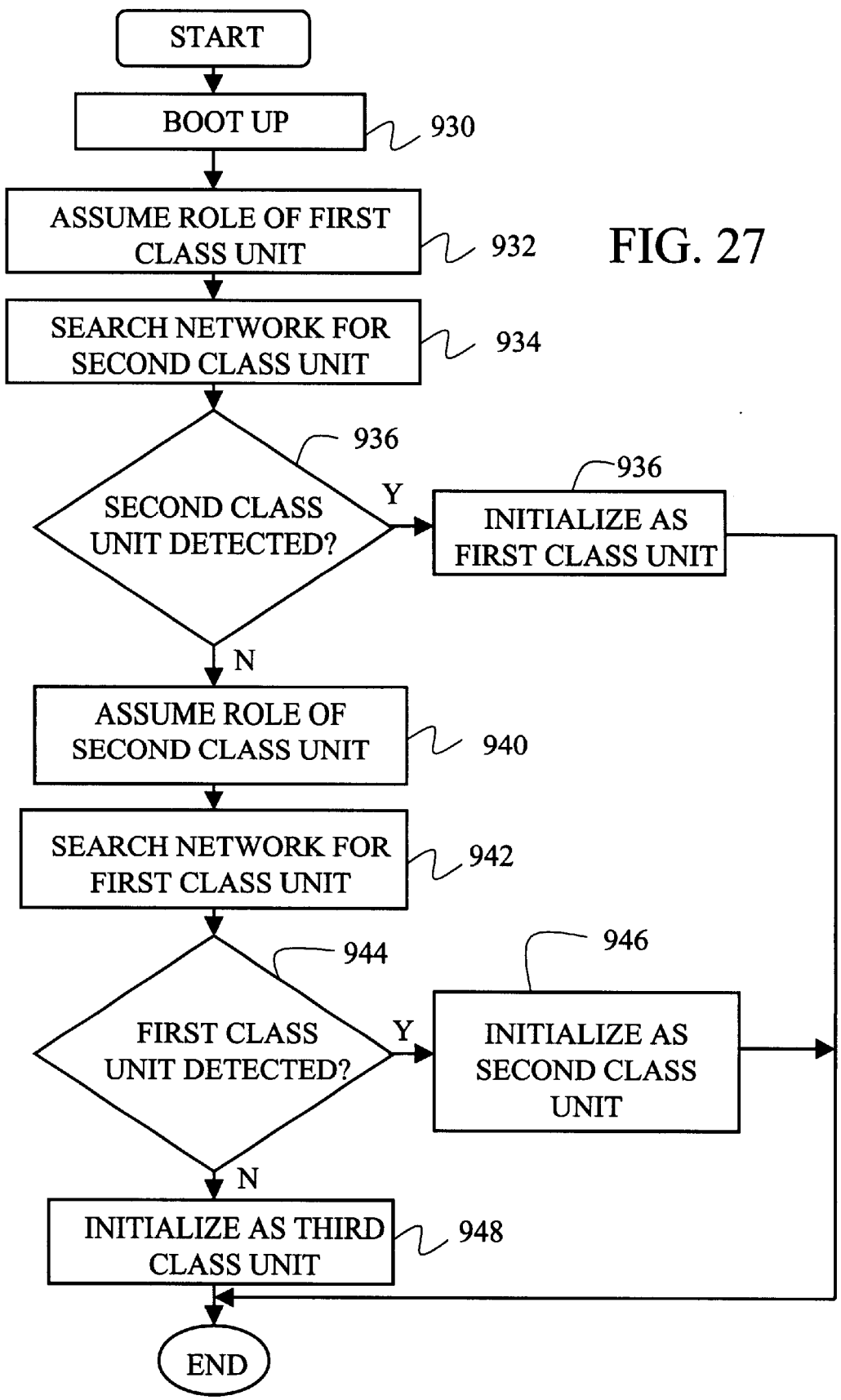
FIG. 27 is a flow diagram of an exemplary status discovery process conducted by a high availability unit.

According to one embodiment of the invention, the initial status determination protocol of each high availability unit as a primary, backup, or stand-alone unit relies on a self-discovery process. FIG. 27 is a flow diagram of an exemplary status discovery process according to one embodiment of the invention. In step 930, a first high availability unit (unit X) that has not yet definitively discovered its status as a primary or a backup unit boots up, and in step 932 assumes the role of a backup unit. In step 934, unit X searches the network for a primary unit and inquires, in step 936, whether a primary unit has been detected. If the answer is YES, unit X tries to connect to the primary unit. If it is successful, unit X initializes as the backup unit in step 938. If, on the other hand, unit X does not detect the primary unit, unit X assumes the role of the primary unit in step 940.

In step 942, unit X searches the network for a backup unit. If the backup unit is detected, as inquired in step 944, unit X connects to the backup unit and initializes as the primary unit in step 946. If, on the other hand, unit X does not detect any other units in the network within a predetermined time, unit X initializes as a stand-alone unit in step 948.

Once the primary and secondary units have been initialized, configuration changes of the primary unit are also transferred to the backup unit in order to keep the two units synchronized. The configuration information is preferably stored in an LDAP database such as the central policy server database 130 or policy agent databases 124, 126.

Figure 28:
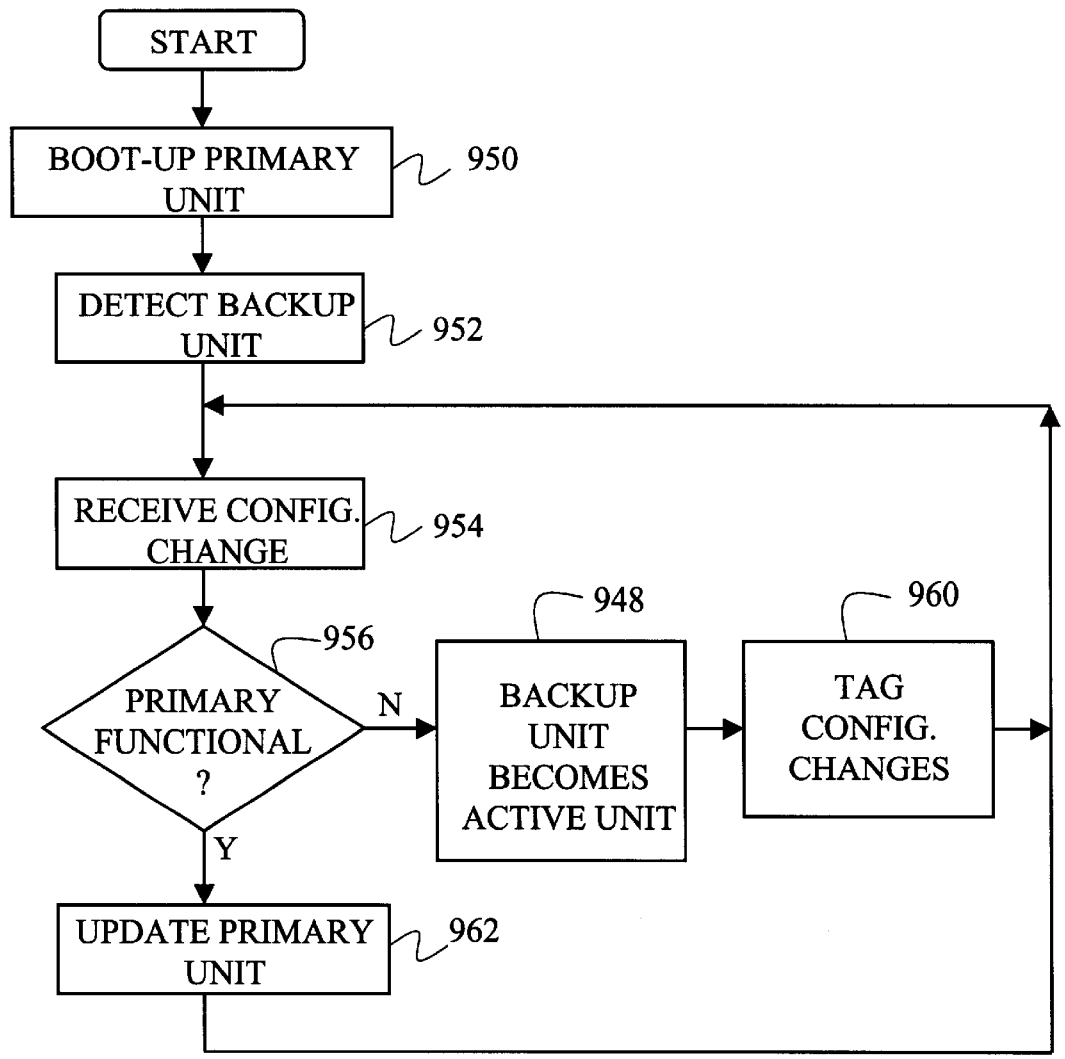
FIG. 28 is a flow diagram of a process for maintaining configuration information synchronized in the primary and backup units of FIG. 26.

FIG. 28 is a flow diagram of a process for maintaining configuration information synchronized in the primary and backup units. In step 950, the primary unit boots up and in step 952, detects the backup unit. In step 954, the backup unit receives configuration change information from the primary unit if it is functional. Otherwise, the configuration changes are entered directly into the backup unit by the network administrator. If the configuration change is to be received from the primary unit, the primary unit notifies the backup unit when configuration changes occur in the primary unit. The changes are then transferred and applied to the backup unit. The backup unit in turn transmits the status of the transfer and the apply back to the primary unit.

In step 956, the primary unit is checked to determine whether it is functional. If it is, the primary unit is likewise updated with the configuration change. Otherwise, if the primary unit is not functional, the backup unit takes on the active role and becomes the active unit in step 958. The primary unit may become non-functional and thus, inactive, due failures in the CPU board, the network interface card, or power supply.

In step 960, the backup unit tags the changes to transfer them to the primary once the primary becomes functional. Once the primary unit becomes functional, the primary unit is updated with the tagged changes maintained by the backup unit as is reflected in step 962.

According to one embodiment of the invention, software updates on the primary and backup units are also synchronized so as to update the primary and backup units serially in a single cycle without the need for multiple update cycles. Thus, the network administrator need not duplicate the efforts of updating the backup unit with the same information as the primary unit.

Figure 29:
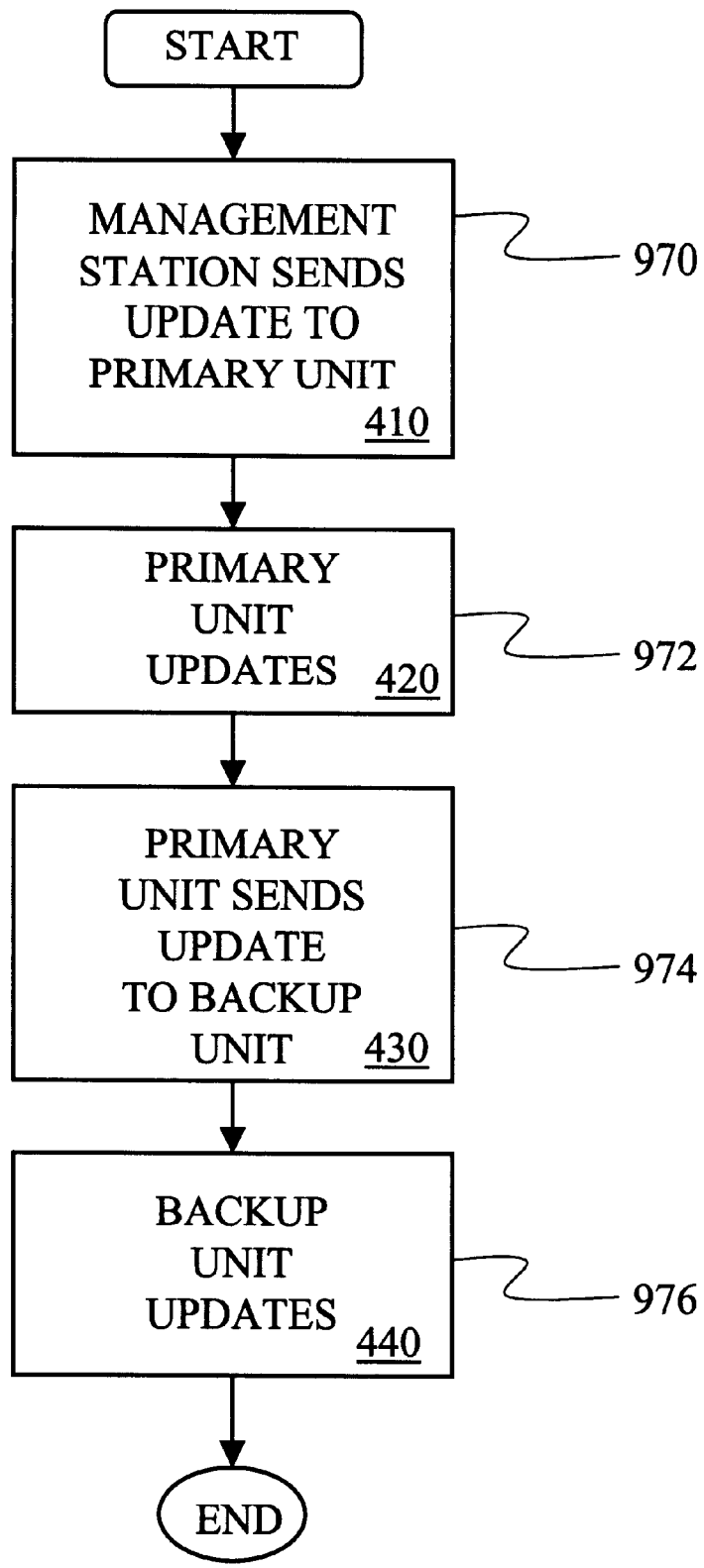
FIG. 29 is an exemplary flow diagram of updating the primary and backup units of FIG. 26 when they are both functional.

FIG. 29 is an exemplary flow diagram of updating the primary and backup units when they are both functional. In step 970, an update, such as a software update not stored in the LDAP databases, is sent/transmitted to the primary unit from a management station accessible by the network administrator. The primary unit then updates itself in step 972. In step 974, the primary unit automatically sends/transmits the update information to the backup unit. In step 976, the backup unit updates itself with the update information received from the primary unit.

Figure 30:
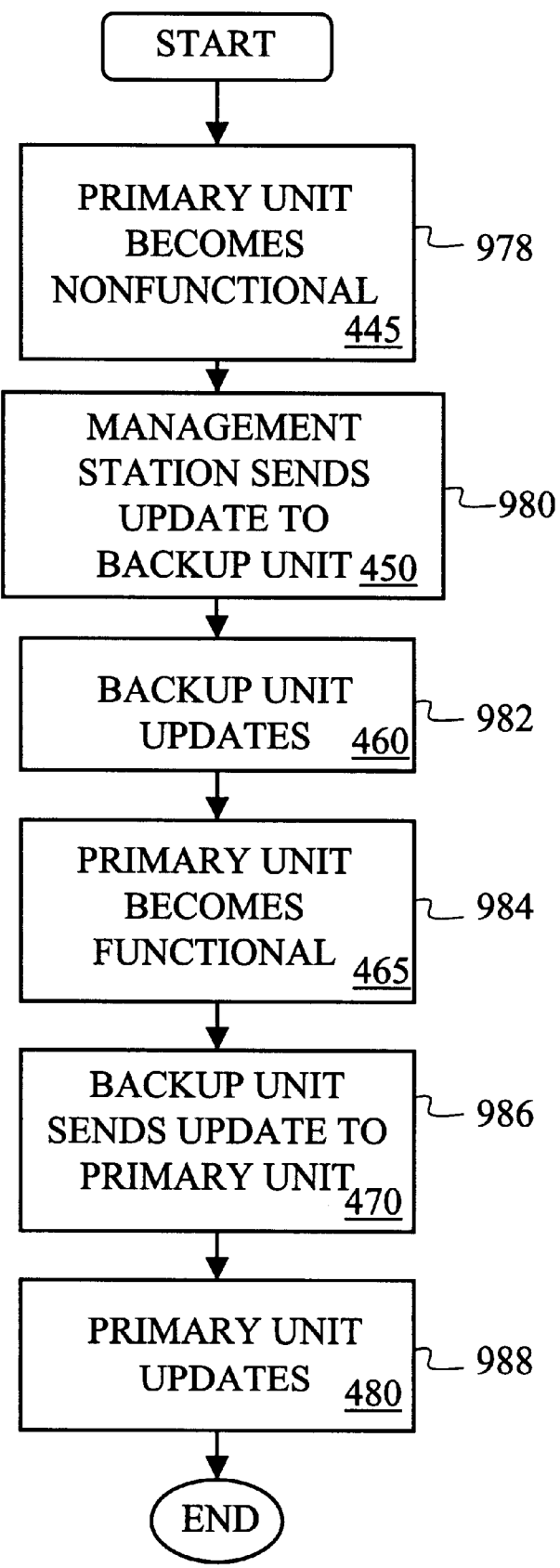
FIG. 30 is an exemplary flow diagram of updating the primary and backup units FIG. 26 when the primary is not functional.

FIG. 30 is an exemplary flow diagram of updating the primary and backup units when the primary unit is not functional. In step 978, the primary unit becomes nonfunctional, and in step 980, the network administrator sends/transmits an upgrade directly to the backup unit instead of the primary unit. In step 982, the backup unit updates itself with the information received from the management station and waits for the primary unit to become functional. Once the primary unit becomes functional 984, the update is automatically sent/transmitted to the primary unit for upgrading in step 986. The primary unit then updates itself in step 988.

Although the present invention has been described in detail with reference to the preferred embodiments thereof, those skilled in the art will appreciate that various substitutions and modifications can be made to the examples described herein while remaining within the spirit and scope of the invention as defined in the appended claims.

For example, the unified policy management system of FIG. 1 should be viewed as illustrative rather than limiting. It should be apparent to those skilled in the art who are enlightened by the present invention that many alternative configurations are possible. For example, there may be additional networks with policy enforcers or no additional networks at all. Likewise, policy enforcers may not necessarily access the policy server through the Internet, but may be connected via other means such as a WAN, MAN, etc. In short, the number and type of users and resources within and without the organization can vary greatly while staying within the scope of the invention.

What is claimed is:

1. A system for selective database synchronization comprising:

a central database storing configuration information for a plurality of edge devices in an organization, each edge device being associated with a network in the organization and configured to manage policies for the network;

a subordinate database storing a portion of the configuration information associated with a particular edge device; and a central policy server in communication with the central database and the subordinate database, the central policy server including logic for:

making a change to the portion of the configuration information associated with the particular edge device in the central database;

creating a first log of the change;

storing the first log of the change in the central database;

receiving from a user a request to apply the change to the subordinate database; and creating, in response to the user request, a second log of the change for transferring the change in the second log to the particular edge device and updating the subordinate database.

2. The system of claim 1, wherein the first log is associated with a particular user making the change, the particular user being associated with the particular edge device.

3. The system of claim 2, wherein the central policy server further includes logic for identifying the particular edge device based on the particular user making the change.

4. The system of claim 3, wherein the second log is associated with the particular edge device.

5. The system of claim 1, wherein the central policy server further includes logic for:

receiving from the particular edge device a status of the transfer of the change; and deleting the second log from the central database if the status indicates a successful transfer.

6. The system of claim 1, wherein the central database and the subordinate database are Lightweight Directory Access Protocol (LDAP) databases storing configuration information as an LDAP entry identified by a distinguished name.

7. The system of claim 1, wherein the configuration information is policy management information.

8. A method for selective database synchronization comprising:

storing in a central database configuration information for a plurality of edge devices in an organization, each edge device being associated with a network in the organization and configured to manage policies for the network;

storing in a subordinate database a portion of the configuration information associated with a particular edge device; and making a change to the portion of the configuration information associated with the particular edge device in the central database;

creating a first log of the change;

storing the log in the central database;

receiving from a user a request to apply the change to the subordinate database;

creating, in response to the user request, a second log of the change for transferring the change to the particular edge device; and updating the subordinate database based on the change.

9. The method of claim 8, wherein the first log is associated with a particular user making the change, the particular user being associated with the particular edge device.

10. The method of claim 9 further comprising identifying the particular edge device based on the particular user making the change.

11. The method of claim 10, wherein the second log is associated with the particular edge device.

12. The method of claim 8 further comprising:

receiving from the particular edge device a status of the transfer of the change; and deleting the second log from the central database if the status indicates a successful transfer.

13. The method of claim 8, wherein the central database and the subordinate database are Lightweight Directory Access Protocol (LDAP) databases storing configuration information as an LDAP entry identified by a distinguished name.

14. The method of claim 8, wherein the configuration information is policy management information.

15. A data communication network comprising:

a server including a first database;

a plurality of edge device coupled to the server, at least one of the edge devices including a second database, characterized in that the first database stores management information for the plurality of the edge devices and the second database stores at least a portion of the management information associated with its edge device, further characterized in that management information changed in the first database is maintained in a first log, the first log further indicating one or more edge devices to receive the changed management information, the server being configured to receive from a user a request to apply the changed management information to the second database and create, in response to the user request, a second log of the changed management information for transmitting the changed management information in the second log to the one or more edge devices and causing update in selected portions of their respective second databases with the changed management information.

16. In a data communication network including a server and a plurality of edge devices, a method for selective database synchronization of the edge devices, the method comprising:

storing in a first database management information for the plurality of the edge devices;

storing in a second database at least a portion of the management information associated with one of the edge devices;

making a change in the management information stored in the first database;

storing the changed management information in a first log, the first log indicating one or more of the edge devices to receive the changed management information;

receiving from a user a request to apply the changed management information to the second database;

creating, in response to the user request, a second log of the changed management information for transmitting the changed management information indicated in the second log to the one or more edge devices; and updating a selected portion of the second database with the changed management information.

17. A system for selective database synchronization comprising:

a first database storing configuration information for a plurality of edge devices, each edge device being associated with a network and configured to manage policies for the network;

a second database storing a portion of the configuration information associated with a particular edge device; and a server in communication with the first database and the second database, the server including logic for:

receiving from a user a change to the portion of the configuration information associated with the particular edge device;

storing the change in a first log associated with the user;

receiving from the user a request to apply the change;

obtaining the change from the first log in response to the user request to apply;

storing the obtained change in a second log associated with the particular edge device; and transmitting the change stored in the second log to the particular edge device for updating the second database.

* * * * *